US010281588B2

(12) United States Patent
Ashjaee

(10) Patent No.: US 10,281,588 B2
(45) Date of Patent: May 7, 2019

(54) GNSS SURVEYING USING RTK ENGINE VERIFICATION

(71) Applicant: JAVAD GNSS, Inc., San Jose, CA (US)

(72) Inventor: Javad Ashjaee, Saratoga, CA (US)

(73) Assignee: JAVAD GNSS, INC., San Jose, CA (US)

( * ) Notice: Subject to any disclaimer, the term of this patent is extended or adjusted under 35 U.S.C. 154(b) by 479 days.

(21) Appl. No.: 14/802,895

(22) Filed: Jul. 17, 2015

(65) Prior Publication Data
US 2016/0018530 A1 Jan. 21, 2016

Related U.S. Application Data

(60) Provisional application No. 62/025,813, filed on Jul. 17, 2014, provisional application No. 62/032,292, filed on Aug. 1, 2014, provisional application No. 62/088,317, filed on Dec. 5, 2014.

(51) Int. Cl.
*G01S 19/44* (2010.01)
*G01S 19/42* (2010.01)
*G01S 19/43* (2010.01)

(52) U.S. Cl.
CPC ............ *G01S 19/44* (2013.01); *G01S 19/426* (2013.01); *G01S 19/43* (2013.01); *G01S 19/428* (2013.01)

(58) Field of Classification Search
CPC .......... G01S 19/12; G01S 19/40; G01S 19/41; G01S 19/421; G01S 19/423; G01S 19/425; G01S 19/426; G01S 19/428; G01S 19/43; G01S 19/44; G01S 19/45; G01S 19/46
See application file for complete search history.

(56) References Cited

U.S. PATENT DOCUMENTS

| 8,022,868 B2 | 9/2011 | Yudanov et al. |
| 8,094,087 B2 | 1/2012 | Ashjaee et al. |
| 8,120,527 B2 | 2/2012 | Ashjaee et al. |

(Continued)

FOREIGN PATENT DOCUMENTS

WO 2008/124657 A1 10/2008

OTHER PUBLICATIONS

International Search Report and Written Opinion received for PCT Application No. PCT/US2015/041001, dated Feb. 2, 2016, 24 pages.

(Continued)

*Primary Examiner* — Olumide Ajibade Akonai
*Assistant Examiner* — Daniel P Malley, Sr.
(74) *Attorney, Agent, or Firm* — Morrison & Foerster LLP

(57) ABSTRACT

Systems and methods for performing land surveying using real-time kinematic (RTK) engine verification are provided. In one example, a first set of positions of a GNSS receiver may be determined using each of a plurality of RTK engines. If a number of the plurality of RTK engines that produce a fixed solution is greater than or equal to a threshold value, a position of the GNSS receiver may be determined based on at least a portion of the first set of positions. The determined position may then be stored. This process may be repeated any number of times to produce a desired number of stored positions. In response to the number of stored positions being equal to a minimum value, a final position of the GNSS device may be determined based on the stored positions.

16 Claims, 19 Drawing Sheets

(56) References Cited

U.S. PATENT DOCUMENTS

| | | | |
|---|---|---|---|
| 8,125,376 B1 | 2/2012 | Ashjaee et al. | |
| 8,169,379 B2 | 5/2012 | Zhukov et al. | |
| 8,224,525 B1 | 7/2012 | Rapoport et al. | |
| 8,606,498 B2 | 12/2013 | Pesterev et al. | |
| 8,717,232 B2 | 5/2014 | Ashjaee et al. | |
| 8,717,233 B2 | 5/2014 | Ashjaee et al. | |
| 8,872,700 B2 | 10/2014 | Ashjaee et al. | |
| 8,975,967 B2 | 3/2015 | Ashjaee et al. | |
| 2009/0189804 A1* | 7/2009 | Ashjaee | G01S 19/14 342/357.27 |
| 2010/0214162 A1* | 8/2010 | Talbot | G01S 19/44 342/357.26 |
| 2010/0225532 A1* | 9/2010 | France | G01S 19/40 342/357.23 |
| 2011/0075886 A1 | 3/2011 | Ashjaee et al. | |
| 2011/0115669 A1* | 5/2011 | Milyutin | G01S 19/20 342/357.27 |
| 2011/0187598 A1* | 8/2011 | Dai | G01S 19/44 342/451 |
| 2011/0205109 A1* | 8/2011 | Miyake | G01S 19/43 342/357.29 |
| 2011/0210889 A1* | 9/2011 | Dai | G01S 19/235 342/357.29 |
| 2011/0231057 A1 | 9/2011 | Ashjaee et al. | |
| 2012/0229333 A1 | 9/2012 | Ashjaee et al. | |
| 2012/0256788 A1* | 10/2012 | Ashjaee | G01S 19/43 342/357.23 |
| 2012/0299936 A1 | 11/2012 | Ashjaee et al. | |
| 2013/0030684 A1* | 1/2013 | Wirola | G01S 5/0289 701/300 |
| 2013/0080051 A1 | 3/2013 | Gribkov et al. | |
| 2013/0207838 A1* | 8/2013 | Kobayashi | G01S 19/36 342/357.25 |
| 2014/0062778 A1 | 3/2014 | Ashjaee et al. | |
| 2014/0077865 A1 | 3/2014 | Ashjaee et al. | |
| 2014/0375493 A1* | 12/2014 | Weisenburger | G01S 19/48 342/357.3 |
| 2014/0378171 A1* | 12/2014 | Rudow | H04W 64/00 455/456.6 |
| 2015/0054685 A1 | 2/2015 | Ashjaee | |
| 2015/0100269 A1 | 4/2015 | Ashjaee | |
| 2015/0116145 A1 | 4/2015 | Ashjaee | |
| 2015/0234055 A1 | 8/2015 | Ashjaee et al. | |

OTHER PUBLICATIONS

Invitation to Pay Additional Fees received for PCT Patent Application No. PCT/US2015/041001, dated Oct. 23, 2015, 6 pages.

Carcanague et al., "Low-Cost Single-Frequency GPS/GLONASS RTK for Road Users", Proceedings of the Institute of Navigation, Apr. 23-25, 2013, pp. 168-184.

Odijk et al., "Single-Frequency Integer Ambiguity Resolution Enabled GPS Precise Point Positioning", Journal of Surveying Engineering, vol. 138, pp. 193-202.

* cited by examiner

| | Total Measurements | | |
|---|---|---|---|
| NONE | total 2 times | total 3 times | total 4 times |
| total 5 times | total 6 times | total 7 times | total 8 times |
| total 9 times | total 10 times | total 11 times | total 12 times |
| total 13 times | total 14 times | total 15 times | total 16 times |

Esc

Interface
400

| | 1 | 2 | 3 | 4 | 5 | 6 | Fix |
|---|---|---|---|---|---|---|---|
| 1 | | | | | | | 1 |
| 2 | | | | | | | 1 |
| 3 | | | | | | | 1 |
| 4 | | | | | | | 1 |
| 5 | | | | | | | 1 |

Measurements (rows) / Engines (columns)

| | 1 | 2 | 3 | 4 | 5 | Fix |
|---|---|---|---|---|---|---|
| 1 | ▓ | ▓ | | ▓ | | 1 |
| 2 | | ▓ | ▓ | ▓ | | 2 |
| 3 | | | ▓ | | ▓ | 2 |
| 4 | | | | | ▓ | 2 |
| 5 | | | | | | 2 |
| 6 | | | | | | 2 |

Engines (rows) / Measurements (columns)

Figure 11

| Measurements | | | | | | Fix | Wt. |
|---|---|---|---|---|---|---|---|
| | 1 | 2 | 3 | 4 | 5 | | |
| 1 | | | | | | 1 | 1.00 |
| 2 | | | | | | 1 | 0.00 |
| 3 | | | | | | 1 | 0.00 |
| 4 | | | | | | 1 | 0.00 |
| 5 | | | | | | 1 | 0.00 |
| 6 | | | | | | | |

Figure 13

| | 1 | 2 | 3 | 4 | 5 | 6 | Fix | Wt. |
|---|---|---|---|---|---|---|---|---|
| 1 | ▓ | | | | | | 1 | 1.00 |
| 2 | | ▓ | | | | | 1 | 1.00 |
| 3 | | | ▓ | | | | 1 | 1.00 |
| 4 | | | | ▓ | | | 1 | 1.00 |
| 5 | | | | | ▓ | | 1 | 1.00 |

Engines (rows) / Measurements (columns)

Figure 14

| | 1 | 2 | 3 | 4 | 5 | 6 | Fix | Wt. |
|---|---|---|---|---|---|---|---|---|
| 1 | ▓ |   |   |   |   |   | 1 | 1.00 |
| 2 | ▓ | ▓ |   |   |   |   | 2 | 1.00 |
| 3 |   | ▓ | ▓ |   |   |   | 2 | 1.00 |
| 4 |   | ▓ |   |   |   |   | 2 | 1.00 |
| 5 |   |   | ▓ | ▓ |   |   | 2 | 1.25 |

Engines / Measurements

Figure 15

|   | 1 | 2 | 3 | 4 | 5 | Fix | Wt. |
|---|---|---|---|---|---|---|---|
| 1 | ▓ |   | ▓ |   |   | 4 | 1.75 |
| 2 | ▓ |   | ▓ | ▓ | ▓ | 4 | 1.25 |
| 3 | ▓ | ▓ | ▓ | ▓ | ▓ | 4 | 1.25 |
| 4 | ▓ | ▓ | ▓ | ▓ | ▓ | 4 | 1.00 |
| 5 |   | ▓ |   | ▓ |   | 4 | 1.00 |
| 6 |   | ▓ |   |   | ▓ |   |   |

Engines (rows) / Measurements (columns)

Figure 16

| | 1 | 2 | 3 | 4 | 5 | 6 | Fix | Wt. |
|---|---|---|---|---|---|---|---|---|
| 1 | ▓ | | | | | | 1 | 1.00 |
| 2 | | ▓ | | | | | 1 | 1.00 |
| 3 | | | ▓ | | | | 1 | 1.00 |
| 4 | | ▓ | | | | | 1 | 1.00 |
| 5 | | | | ▓ | | | 1 | 1.00 |

Measurements / Engines

Figure 17

GNSS SURVEYING USING RTK ENGINE VERIFICATION

CROSS REFERENCE TO RELATED APPLICATION

This application claims priority from U.S. Provisional Ser. No. 62/025,813, filed on Jul. 17, 2014; U.S. Provisional Ser. No. 62/032,292, filed on Aug. 1, 2014; and U.S. Provisional Ser. No. 62/088,317, filed on Dec. 5, 2014, all of which are entitled GNSS SURVEYING USING RTK ENGINE VERIFICATION, each of which is hereby incorporated by reference in its entirety for all purposes.

BACKGROUND

1. Field

The present disclosure relates to Global Navigation Satellite System (GNSS) devices and, more specifically, to GNSS devices for performing land surveying using real-time kinematic (RTK) engine verification.

2. Related Art

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to an antenna connected to a base receiver or a network of base receivers with the assumption that the positional coordinates of the base receiver(s) are known with high accuracy. The base receiver or receiver network transmits its measurements for corrections to the full measurements) to a mobile navigation receiver (or rover). The rover receiver uses these corrections to refine its measurements in the course of data processing. The rationale for this approach is that since the pseudo-range measurement errors on the base and rover sides are strongly correlated, using differential measurements will substantially improve positioning accuracy.

Typically, the base is static and located at a known position. However, in relative navigation mode, both the base and rover are moving. In this mode, the user is interested in determining the vector between the base and the rover. In other words, the user is interested in determining the continuously changing rover position relative to the continuously changing position of the base. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time may be performed using an RTK algorithm, which may be stored in memory on the rover. As the name "real-time kinematic" implies, the rover receiver is capable of calculating/outputting its precise position as the raw data measurements and differential corrections become available at the rover. When implementing an RTK algorithm, a data communication link (e.g., a radio communication link, a GSM binary data communication link, etc.) may be used to transmit the necessary information from the base to the rover.

Further improvement of the accuracy in differential navigation/positioning applications can be achieved by using both the carrier phase and pseudo-range measurements from the satellites to which the receivers are locked. For example, by measuring the carrier phase of the signal received from a satellite in the base receiver and comparing it with the carrier phase of the same satellite measured in the rover receiver, one can obtain measurement accuracy to within a small fraction of the carrier's wavelength.

One well-known type of measurement error that can reduce the accuracy of differential navigation/positioning is multipath error. Multipath errors are caused by the reflection of the GNSS satellite signals by surfaces located near the receiving antenna. As a result of these reflections, the antenna receives both the direct signal traveling the shortest path from the satellite to the receiver as well as the reflected signals following indirect paths. The combination of two (or more) signals at the antenna leads to the distortion of raw measurements. Multipath errors may affect both pseudo-range and carrier phase measurements.

BRIEF SUMMARY

Systems and methods for performing land surveying using RTK engine verification are provided. In one example, a first set of positions of a GNSS receiver may be determined using each of a plurality of RTK engines. If a number of the plurality of RTK engines that produce a fixed solution is greater than or equal to a threshold value, a position of the GNSS receiver may be determined based on at least a portion of the first set of positions. The determined position may then be stored. This process may be repeated any number of times to produce a desired number of stored positions. In response to the number of stored positions being equal to a minimum value, a final position of the GNSS device may be determined based on the stored positions.

BRIEF DESCRIPTION OF THE DRAWINGS

FIGS. 3-6 illustrate exemplary interfaces for configuring a GNSS device according to various examples.

FIGS. 9-11 each illustrate results of five example measurements using six different RTK engines.

FIGS. 13-17 each illustrate results of five example measurements using six different RTK engines and weights associated with the measurements.

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

Systems and methods for performing land surveying using RTK engine verification are provided. In one example, a first set of positions of a GNSS receiver may be determined using each of a plurality of RTK engines. If a number of the plurality of RTK engines that produce a fixed solution is greater than or equal to a threshold value, a position of the GNSS receiver may be determined based on at least a portion of the first set of positions. The determined position may then be stored. This process may be repeated any number of times to produce a desired number of stored positions. In response to the number of stored positions being equal to a minimum value, a final position of the GNSS device may be determined based on the stored positions.

Figure 1:
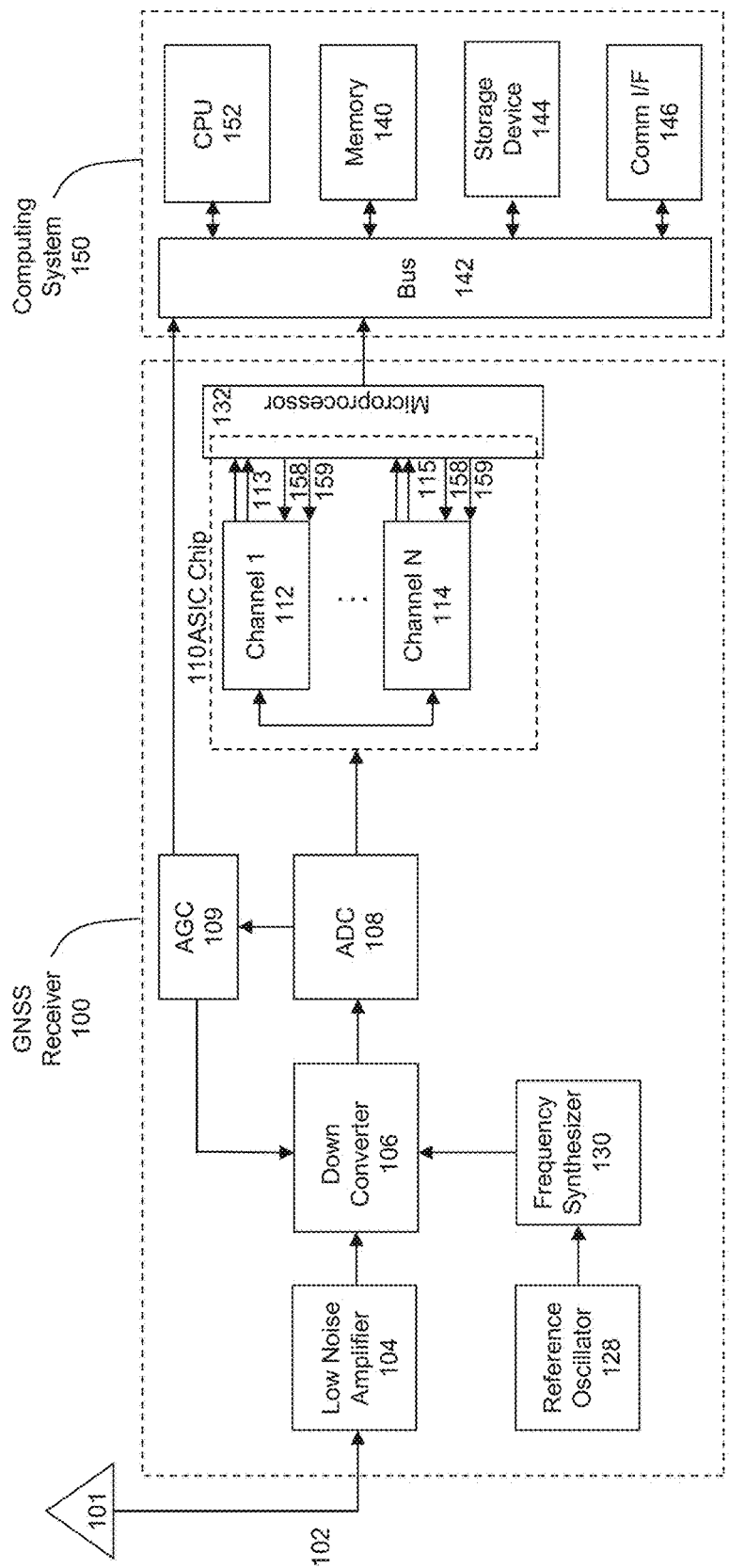
FIG. 1 illustrates an exemplary GNSS receiver and computing system according to various examples.

FIG. 1 illustrates an exemplary GNSS receiver 100 that may be used within a GNSS device to perform land surveying using RTK engine verification according to various examples. GNSS receiver 100 may receive GNSS signals 102, such as GPS or GLONASS signals, via a GNSS antenna 101. GNSS signal 102 may contain two pseudo-noise ("PN") code components, a coarse code, and a precision code residing on orthogonal carrier components, which may be used by GNSS receiver 100 to determine the position of the GNSS receiver. For example, a typical GNSS signal 102 may include a carrier signal modulated by two PN code components. The frequency of the carrier signal may be satellite specific. Thus, each GNSS satellite may transmit a GNSS signal at a different frequency.

GNSS receiver 100 may further include a low noise amplifier 104, a reference oscillator 128, a frequency synthesizer 130, a down converter 106, an automatic gain control (AGC) 109, and an analog-to-digital converter (ADC) 108. These components may perform amplification, filtering, frequency down-conversion, and sampling. The reference oscillator 128 and frequency synthesizer 130 may generate a frequency signal to down convert the GNSS signals 102 to baseb and or to an intermediate frequency that depends on the entire receiver frequency plan design and available electronic components. The ADC 108 may then convert the GNSS signals 102 to a digital signal by sampling multiple repetitions of the GNSS signals 102.

GNSS receiver 100 may further include multiple GNSS channels, such as channels 112 and 114. It should be understood that any number of channels may be provided to receive and demodulate GNSS signals 102 from any number of satellites. The GNSS channels 112 and 114 may each contain a demodulator to demodulate a GNSS PN code contained in ADC signal 109, a PN code reference generator, a numerically controlled oscillator (code NCO) to drive the PN code generator as well as a carrier frequency demodulator (e.g., a phase detector of a phase locked loop—PLL), and a numerically controlled oscillator to form a reference carrier frequency and phase (carrier NCO). In one example, the numerically controlled oscillator (code NCO) of channels 112 and 114 may receive code frequency/phase control signal 158 as input. Further, the numerically controlled oscillator (carrier NCO) of channels 112 and 114 may receive carrier frequency/phase control signal 159 as input.

In one example, the processing circuitry for the GNSS channels may reside in an application specific integrated circuit ("ASIC") chip 110. When a corresponding frequency is detected, the appropriate GNSS channel may use the embedded PN code to determine the distance of the receiver from the satellite. This information may be provided by GNSS channels 112 and 114 through channel output vectors 113 and 115, respectively. Channel output vectors 113 and 115 may each contain four signals forming two vectors—inphase I and quadriphase Q which are averaged signals of the phase loop discriminator (demodulator) output, and inphase dl and quadriphase dQ—averaged signals of the code loop discriminator (demodulator) output.

In some examples, a computing system 150 may be coupled to receive position information (e.g., in the form of channel output vectors 113 and 115 or any other representation of position) from GNSS receiver 100. Computing system 150 may include processor-executable instructions for performing RTK verification (e.g., for performing process 200, described in greater detail below with respect to FIG. 2), stored in memory 140. The instructions may be executable by one or more processors, such as a CPU 152. However, those skilled in the relevant art will also recognize how to implement the current technology using other computer systems or architectures. CPU 152 may be implemented using a general or special purpose processing engine such as, for example, a microprocessor, microcontroller or other control logic. In this example, CPU 152 is connected to a bus 142 or other communication medium.

Memory 140 may include read only memory ("ROM") or other static storage device coupled to bus 142 for storing static information and instructions for CPU 152. Memory 140 may also include random access memory (RAM) or other dynamic memory, for storing information and instructions to be executed by CPU 152. Memory 140 may also be used for storing temporary variables or other intermediate information during execution of instructions to be executed by CPU 152.

Computing system 150 may further include an information storage device 144 coupled to bus 142. The information storage device may include, for example, a media drive (not shown) and a removable storage interface (not shown). The media drive may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media may include, for example, a hard disk, floppy disk, magnetic tape, optical disk, CD or DVD, or other fixed or removable medium that is read by and written to by media drive. As these examples illustrate, the storage media may include a non-transitory computer-readable storage medium having stored therein particular computer software or data.

In other examples, information storage device 144 may include other similar instrumentalities for allowing computer programs or other instructions or data to be loaded into computing system 150. Such instrumentalities may include, for example, a removable storage unit (not shown) and an interface (not shown), such as a program cartridge and cartridge interface, a removable memory (e.g., a flash memory or other removable memory module) and memory slot, and other removable storage units and interfaces that allow software and data to be transferred from the removable storage unit to computing system 150.

Computing system 150 may further include a communications interface 146. Communications interface 146 may be used to allow software and data to be transferred between computing system 150 and external devices. Examples of communications interface 146 may include a modem, a network interface (such as an Ethernet or other NIC card), a communications port (such as for example, a USB port), a PCMCIA slot and card, etc. Software and data transferred via communications interface 146. Some examples of a communication interface 146 include a phone line, a cellular phone link, an RF link, a network interface, a local or wide area network, and other communications channels.

In some examples, GNSS receiver 100 and computing system 150 may be included within a handheld GNSS device similar or identical to that described in U.S. patent application Ser. No. 12/871,705, filed Aug. 30, 2010, issued as U.S. Pat. No. 8,125,376, and assigned to the assignee of the present application, which is incorporated herein by reference in its entirety for all purposes. For example, the handheld GNSS device may include a display, orientation sensors, distance sensors, a camera, a compass, and the like, coupled to GNSS receiver 100 and/or computing system 150.

Figure 2:
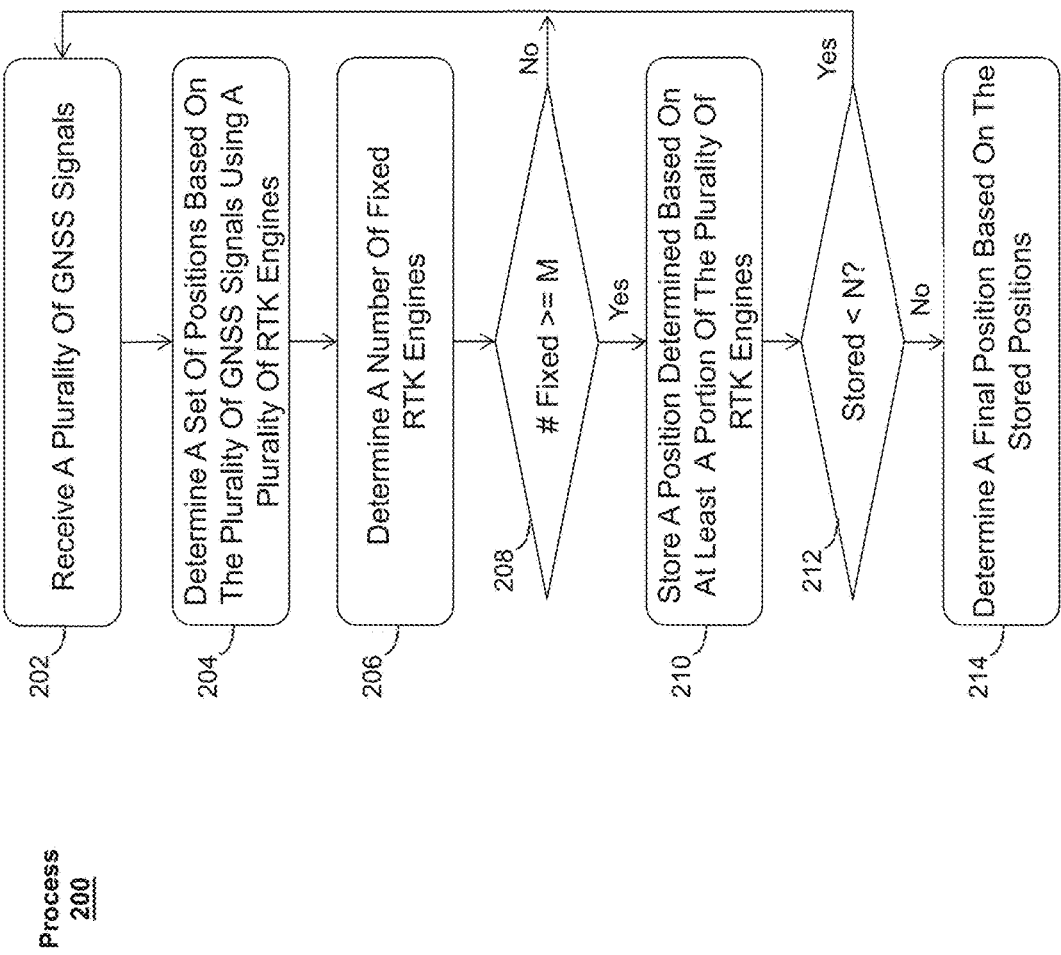
FIG. 2 illustrates an exemplary process for performing land surveying using RTK engine verification according to various examples.

FIG. 2 illustrates an exemplary process 200 for performing land surveying using RTK engine verification according to various examples. In some examples, process 200 may be performed by a GNSS device having a GNSS receiver and computing system similar or identical to GNSS receiver 100 and computing system 150.

At block 202, a plurality of GNSS signals may be received by a GNSS device. The plurality of GNSS signals may include GNSS signals from any number of GPS and/or GLONASS satellites and may be received by an antenna (e.g., antenna 101) of a GNSS receiver similar or identical to GNSS receiver 100 of the GNSS device. The received GNSS signals may be processed using RF front-end circuitry of the GNSS receiver. For example, the GNSS signals may be amplified using an amplifier (e.g., low noise amplifier 104) to amplify the received GNSS signals. The amplified GNSS signals may be down-converted to baseband (or another intermediate frequency that depends on the entire receiver frequency plan design and available electronic components) using an oscillator (e.g., reference oscillator 128), a frequency synthesizer (e.g., frequency synthesizer 130), and a down-converter (e.g., down-converter 106). In some examples, an automatic gain control (e.g., AGC 109) may be used to adjust the amount of gain applied to the down-converted GNSS signals to a suitable level. The down-converted GNSS signals may also be converted from analog form to digital form using an analog-to-digital converter (e.g., ADC 108). The down-converted GNSS signals may further be demodulated and processed by channels of the GNSS receiver (e.g., channels 112 and 114).

At block 202, a correction signal from at least one base station or network of base stations may also be received by the GNSS device. The correction signal may include correction information that may be used by each RTK engine implemented by the GNSS device to improve the accuracy of the position as determined using the plurality of GNSS signals. The correction signal may be received through, for example, a communications antenna mounted on the GNSS device and connected to a communications receiver or transceiver in the GNSS device (e.g., within communications interface 146).

At block 204, a set of positions of the GNSS receiver may be determined using each of a plurality of RTK engines in accordance with their corresponding set of parameters (discussed below) and based on the correction signal and some or all of the plurality of GNSS signals received at block 202. In some examples, six RTK engines may be used. However, it should be appreciated that any number of RTK engines may be used. The RTK engines may be implemented using an algorithm for computing position and executed on one or more processors (e.g., CPU 152).

In some examples, each of the plurality of RTK engines may include a different set of parameters and/or may implement a different algorithm for computing position. The set of parameters for a particular RTK engine may specify how the RTK engine should operate. In some examples, the sets of parameters may be loaded from memory of the GNSS device. In other examples, the sets of parameters may be obtained from the user through the use of a user interface of the GNSS device. Exemplary parameters that may be included in the sets of parameters may include parameters specifying: the number of satellites to consider in determining a position of the GNSS device, a fading factor, residual ionosphere estimator parameters, how outlier detection should be handled, the tolerances of the integer ambiguity validation procedure, and the like.

The parameter specifying the number of satellites to consider may be used, for example, to limit an RTK engine to using signals from five UPS satellites and three GLONASS satellites that have the strongest signals. In other examples, satellites from other GNSS constellations may also be used. In another example, this parameter may specify that all available satellites should be used. In yet another example, this parameter may specify that only satellites without multipath error should be used. In this example, the chance of multipath error for a satellite may be estimated based upon the correlation between multipath error and elevation of the satellite with respect to the horizon. By limiting the number of satellites, the RTK engine may provide a position faster than an RTK engine using all available satellites.

In some examples, an RTK engine may employ a recursive algorithm for determining position. In these examples, the RTK engine may employ a parameter specifying the fading factor, which determines the weight to be applied to previous data collected by the RTK engine when updating the position determination. A longer fading factor may provide more stability to the RTK engine. However, a shorter fading factor may provide faster and more accurate results under changing environmental conditions that may affect signal reception at the GNSS device.

A residual ionospheric delay estimator may be used to account for the delay in a signal resulting from the signal traveling through the ionosphere. Several parameters control its operation (e.g., expected residual ionospheric delay and expected time of auto-correlation).

One or more parameters may specify how outlier detection is handled. In a case where the atmospheric channel is assumed to be band-limited white noise with a defined variance, then parameters may be defined that specify how aggressive the RTK engine should be in dropping anomalous measurements that violate this error assumption. For example, a parameter may specify a threshold on the probability of an anomalous measurement. If the measurement has a probability of less than a threshold (e.g., $10^{-7}$ or $10^{-10}$), the RTK engine may handle the measurement as an anomalous measurement and may, for example, drop the measurement. In another example, a threshold may be placed on the error associated with a measurement.

The sets of parameters and/or the algorithms for computing position may be selected for each RTK engine to cause the RTK engines to perform in a desired manner. For example, some configurations of an RTK engine may cause it to produce better results in open areas, while other configurations of an RTK engine may cause it to produce better results under trees. Any desired mix of RTK engines may be used.

An RTK engine may produce either an RTK Fixed position or an RTK Float position. Whether or not an RTK Fixed position is obtained may depend, in part, on the integer ambiguity validation procedure. The RTK engine may accept one or more parameters that affect the tolerances of the integer ambiguity validation procedure.

In some examples, in addition to determining the set of positions of the GNSS receiver using each of the plurality of RTK engines, an error indicator associated with each determined position may also be produced at block 204. For example, the RTK engines may produce an RMS error. In other examples, the RTK engines may also indicate the type of solution or position it determined (e.g., float vs. fixed).

In some examples, the plurality of RTK engines may be reset at the start of block 204 prior to determining the position of the GNSS receiver. Resetting the plurality of RTK engines may force the RTK engines to recalculate the ambiguity fixes, which may increase the reliability of the solutions that are produced. In other examples, the RTK engines may not be reset. In these examples, an incorrect fix from a previous RTK calculation may be used and may show drift in position.

A more detailed description of determining a position based on signals from GNSS satellites and base stations is available in U.S. patent application Ser. No. 12/360,808, filed Jan. 27, 2009, published as U.S. Patent Publication No. 2009/0189804, assigned to the assignee of the present application, and which is incorporated herein by reference in its entirety for all purposes. Additionally, a more detailed description of determining a position using multiple RTK engines is available in U.S. patent application Ser. No. 13/437,366, filed Apr. 2, 2012, published as U.S. Patent Publication No. 2012/0256788, assigned to the assignee of the present application, and which is incorporated herein by reference in its entirety for all purposes.

At block 206, a number of the plurality of RTK engines that produced at fixed solution at block 204 may be determined.

At block 208, it may be determined whether or not the number of fixed RTK engines (RTK engines producing a fixed solution) determined at block 206 is greater than or equal to a threshold number of fixed RTK engines (represented by the value M in FIG. 2). The threshold number of fixed RTK engines may be any value equal to or less than the number of the plurality of RTK engines used at block 204. In some examples, the threshold number of fixed RTK engines may be a default number. In other examples, the threshold number of fixed RTK engines may be selected by a user.

If it is determined at block 208 that the number of fixed RTK engines is not greater than or equal to the threshold number of fixed RTK engines, the process may return to block 202. This condition represents a situation in which fewer than a desired number of the RTK engines (the threshold number of fixed RTK engines) were able to produce a fixed solution, which may indicate that some or all of the plurality of received GNSS signals were indirectly reaching the GNSS receiver (e.g., experiencing multipath error). Since these GNSS signals may produce inaccurate results, the positions determined using these GNSS signals may be discarded and new GNSS signals may again be received at block 202.

Alternatively, if it is determined at block 208 that the number of fixed RTK engines is greater than or equal to the threshold number of fixed RTK engines, the process may proceed to block 210. This condition represents a situation in which a desired number of the RTK engines (the threshold number of fixed RTK engines) or more were able to produce a fixed solution, which may indicate that the plurality of received GNSS signals are unlikely to be indirect signals. Since these GNSS signals are more likely to produce accurate results, the positions determined using these GNSS signals may be used in later blocks of process 200, as discussed below.

At block 210, a position determined using some or all of the set of positions determined using the RTK engines may be stored. For example, the GNSS device may store the determined position in memory 140 or storage device 144. In some examples, the position stored at block 210 may include an average of the positions determined by all RTK engines, a non-uniform weighted average of the positions determined by all RTK engines, an average of the positions determined by the fixed RTK engines, a non-uniform weighted average of the positions determined by the fixed RTK engines, or a position determined by one of the RTK engines. The performance of blocks 202, 204, 206, 208, and 210 may be viewed as a single position measurement made using multiple RTK engines. The value determined and stored at block 210 may represent the result of that measurement.

At block 212, it may be determined whether or not the number of stored positions is less than a desired number of measurements (represented by the value N in FIG. 2). The desired number of measurements may be any desired value. In some examples, the desired number of measurements may be a default number. In other examples, the desired number of measurements may be selected by a user.

If it is determined at block 212 that the number of stored position determinations is less than the desired number of measurements, the process may return to block 202 where another plurality of GNSS signals may be received. In some examples, process 200 may repeat blocks 202, 204, 206, 208, 210, and 212 automatically (e.g., without user intervention) to obtain additional position measurements until the number of stored position determinations is equal to the desired number of measurements. Once it is determined at block 212 that the number of stored position determinations is not less than the desired number of measurements, the process may proceed to block 214. As a result of repeating blocks 202, 204, 206, 208, 210, and 212, as discussed above, N position measurements may be stored, where each measurement represents a measurement resulting from at least M RTK engines producing a fixed solution.

At block 214, a final position may be determined based on the stored RTK engine outputs. In some examples, determining the final position may include calculating an average of the stored position determinations. However, it should be appreciated that the final position may be determined based on the stored position determinations in any other desired manner (e.g., selecting one of the stored measurements, calculating a weighted average of the stored measurements, etc.).

Using process 200, a GNSS receiver may produce more reliable position determinations by taking multiple measurements. Additionally, by resetting the RTK engines each time before block 204 is performed, a higher level of assurance that reliable solutions are being produced may be obtained. For example, an incorrect ambiguity fix may produce a low RMS measurement, but could still be off by decimeters. Resetting the RTK engines forces the RTK engines to recalculate the ambiguity fixes, which ensures that reliable solutions are produced. Additionally, by taking multiple measurements, the errors due to the misalignment in compass, level, and pole construction may be reduced or eliminated by rotating the GNSS device between each measurement by an angle equal to 360/(the number of measurements). For example, if four measurements are produced, the GNSS device may be rotated 90 degrees between each measurement to cancel out errors due to the misalignment in compass, level, and pole construction.

Figure 3:
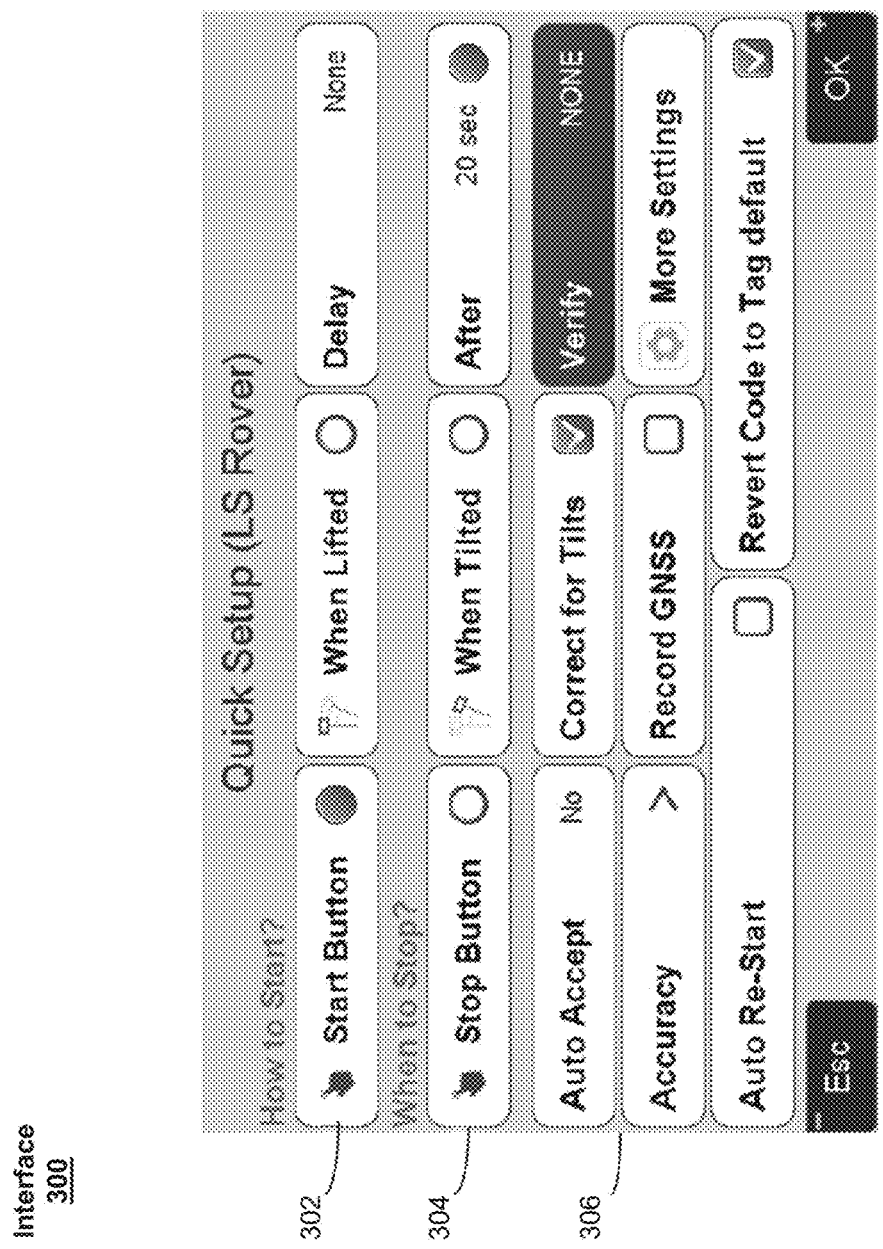

In some examples, the values for M (the threshold number of fixed RTK engines) and N (desired number of measurements) may be selected by a user prior to the performance of process 200 through a graphical user interface displayed on a display of the GNSS device. For example, FIG. 3 illustrates an exemplary interface 300 for configuring a GNSS device to perform process 200. As shown, interface 300 includes start options 302 that include "Start Button," "When Lifted," and "Delay" options. When selected, "Start Button" may indicate that process 200 may start in response to a user selecting a start option, "When Lifted" may indicate that process 200 may start in response to the orientation of the GNSS device being lifted to a predetermined range of angles (this is described in greater detail in Applicants' U.S. patent application Ser. No. 13/301,669, filed Nov. 21, 2011, published as U.S. Patent Publication No. 2012/0299936, which is incorporated herein by reference in its entirety for all purposes), and "Delay" may provide an amount of time after either start option is triggered (the start option is selected or the device is lifted to a predetermined range of angles) before process 200 is initiated.

Interface 300 may further include stop options 304 that include "Stop Button," "When Tilted," and "After" options. When selected, "Stop Button" may indicate that process 200 may stop in response to a user selecting a stop option, "When Tilited" may indicate that process 200 may stop in response to the orientation of the GNSS device being tilted outside of a predetermined range of angles (this is described in greater detail in Applicants' U.S. patent application Ser. No. 13/301,669, filed Nov. 21, 2011, published as U.S. Patent Publication No. 2012/0299936), and "After" may provide an amount of time after process 200 was started at which process 200 may be stopped. It should be appreciated that process 200 may also stop in response to reaching and performing block 214.

Interface 300 may further include additional options 306. As shown, additional options 306 includes the "Verify" option that, when selected, may cause interface 400 shown in FIG. 4 to be displayed. Interface 400 may include multiple selectable options 402 that allow the user to select the desired number of measurements parameter (represented by N in FIG. 2) for process 200. In this example, a value of 3 has been selected. While specific values are shown, it should be appreciated that interface 400 may include any number of selectable options representing any desired values.

Figure 5:
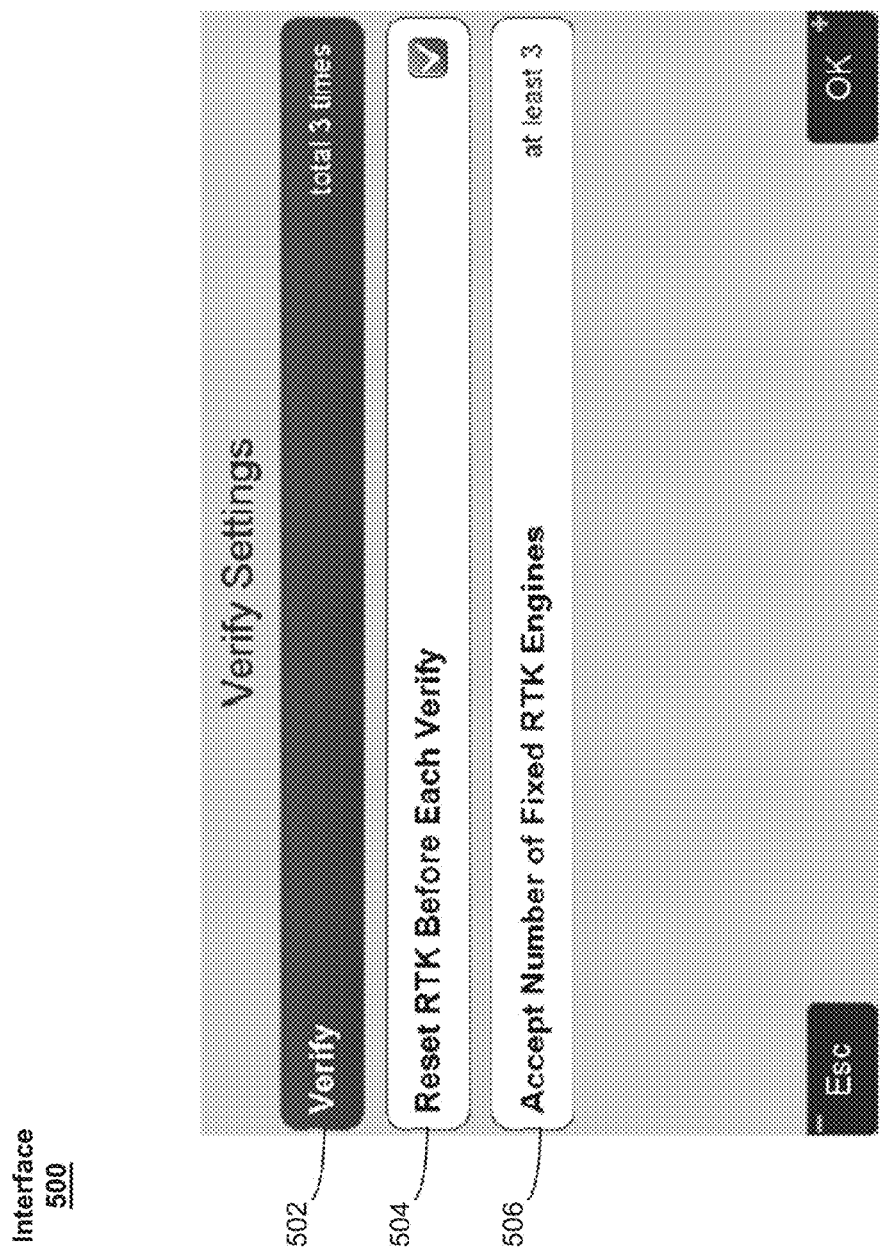
Figure 6:
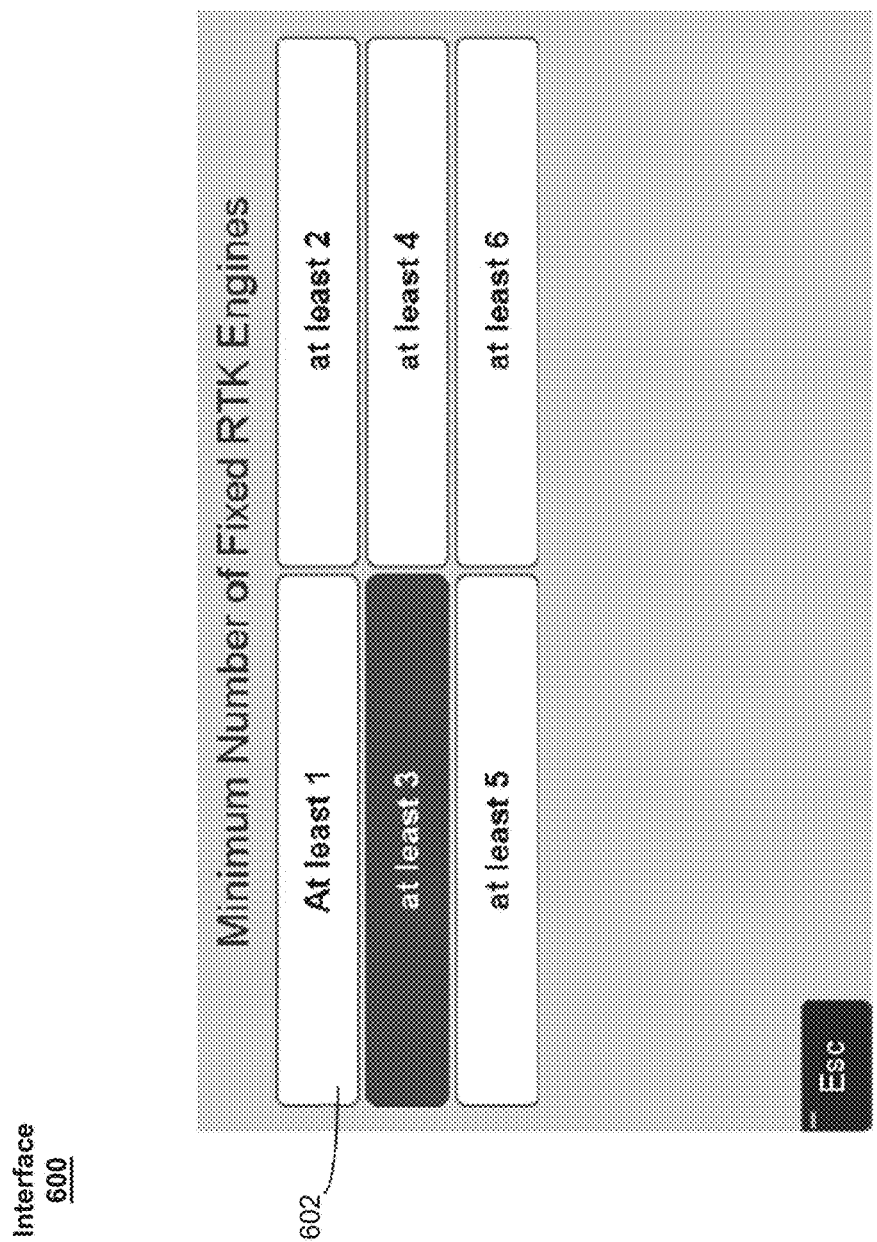

After selection of the desired number of measurements using interface 400, interface 500 shown in FIG. 5 may be displayed on the display of the GNSS device to allow the user to further configure the operation of process 200. As shown in FIG. 5, interface 500 may include option 502 indicating the desired number of measurements selected by the user using interface 400. Interface 500 may further include option 504 that may be toggled on or off to selectively cause the RTK engines to be reset (or not reset) at the start of block 204 of process 200. Interface 500 may further include option 506 that, when selected, may cause interface 600 shown in FIG. 6 to be displayed. Interface 600 may include multiple selectable options 602 that allow the user to select the threshold number of fixed RTK engines parameter (represented by M in FIG. 2) for process 200. In this example, a value of 3 has been selected. While specific values are shown, it should be appreciated that interface 600 may include any number of selectable options representing any desired values. Process 200 may be performed using the values and options selected in interfaces 300, 400, 500, and 600.

Figure 7:
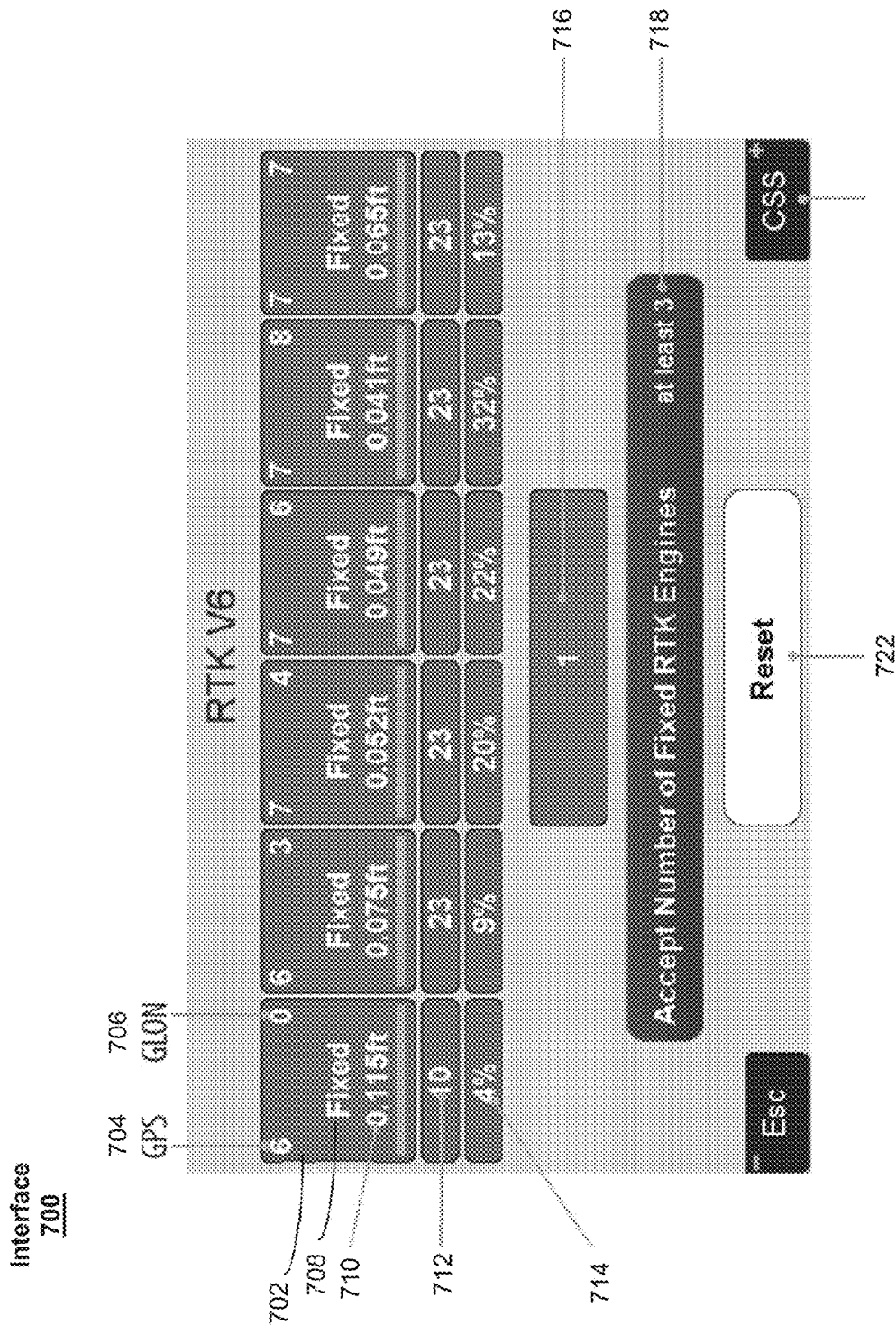
FIG. 7 illustrates an exemplary interface for displaying information associated with the performance of land surveying using RTK engine verification according to various examples.

In some examples, process 200 may further include displaying information associated with the plurality of RTK engines as any one or more of the blocks of process 200 are being performed. For example, FIG. 7 illustrates an example interface 700 that may be displayed on the display of the GNSS device. As shown, interface 700 includes six columns 702 corresponding to the six RTK engines being used by the GNSS device. The top cell of each column 702 includes a first numerical indicator 704 and a second numerical indicator 706 representing the number of GPS and GLONASS satellites, respectively, that are used by the associated RTK engine. The top cell of each column 702 may further include a textual indicator 708 representing the type of solution (fixed or float) being produced by the associated RTK engine. Additionally, the top cell of each column 702 may further include a third numerical indicator 710 value representing the HVRMS for a current time period of an observation session for the associated RTK engine. The middle cell of column 702 may include a fourth numerical indicator 712 representing the number of cycle slips detected for a current time period of an observation session for the associated RTK engine. A more detailed description of cycle slip detection is provided in Applicants' U.S. patent application Ser. No. 14/012,499, filed Aug. 28, 2013, published as U.S. Patent Publication No. 2014/0062778, which is incorporated herein by reference in its entirety for all purposes. The bottom cell of column 702 may include a fifth numerical indicator 714 representing the percentage or weight given to the output of the RTK engine in contributing to the position determination of a particular measurement.

Interface 700 may further include option 716 indicating a delay (in seconds) in receiving RTK corrections.

Interface 700 may further include option 718 that indicates the threshold number of fixed RTK engines parameter (represented by M in FIG. 2) and that may be selected to cause interface 600 to be displayed to adjust this value.

Interface 700 may further include option 722 that may be selected to reset the RTK engines to cause new fixed solutions to be determined.

While the example interface 700 shown in FIG. 7 includes six columns 702 for six RTK engines, it should be appreciated that any number of RTK engines may be used and that corresponding columns 702 of information may be displayed.

Figure 8:
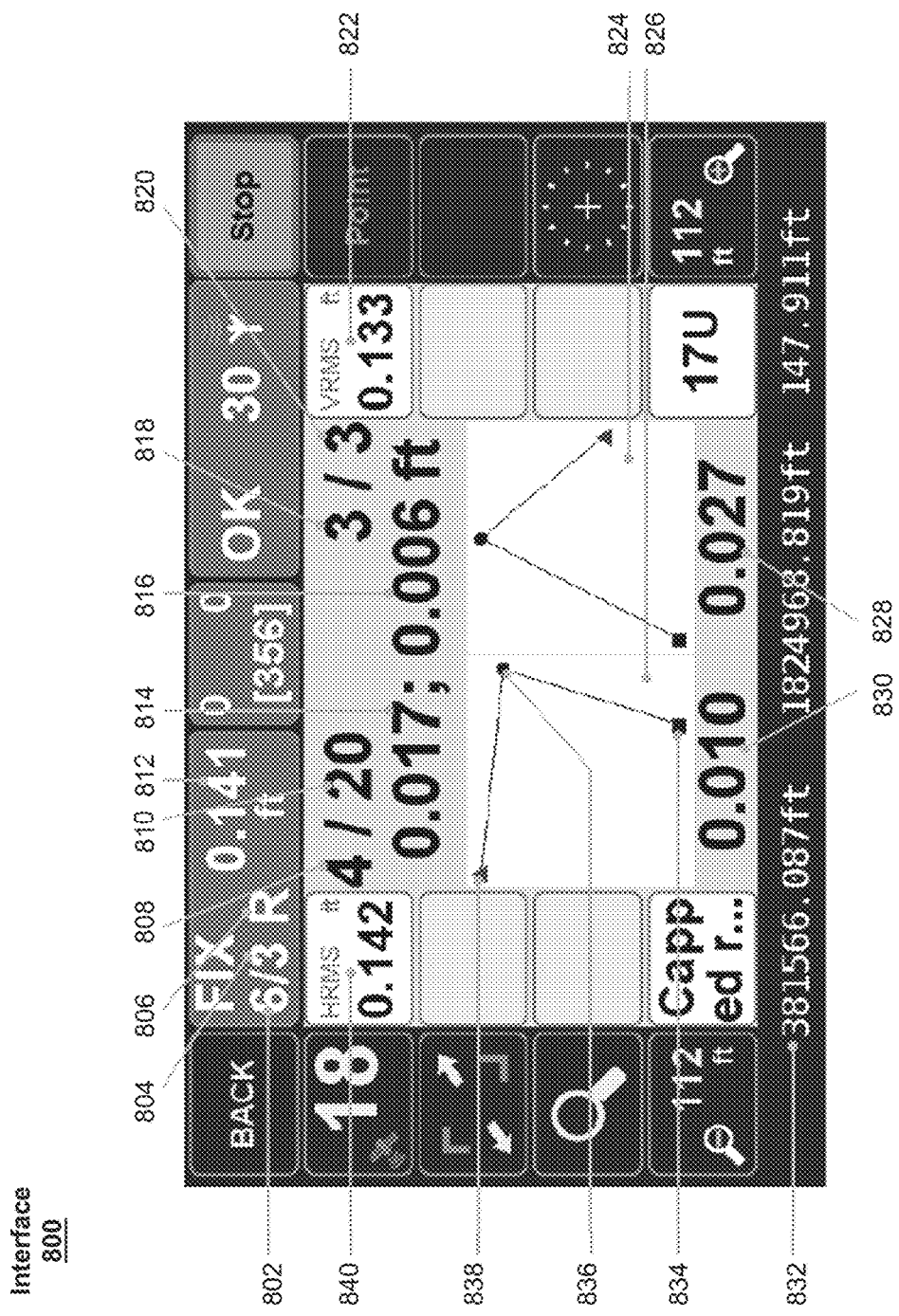
FIG. 8 illustrates an exemplary interface for displaying output information associated with the performance of land surveying using RTK engine verification according to various examples.

In some examples, process 200 may further include displaying numerical and graphical representations of the outputs of the plurality of RTK engines as any one or more of the blocks of process 200 are being performed. For example, FIG. 8 illustrates an example interface 800 that may be displayed on the display of the GNSS device. As shown, interface 800 includes element 802 representing the number of RTK engines used by process 200, element 804 representing the threshold number of fixed RTK engines (represented by M in FIG. 2), element 806 indicating whether or not the RTK engines are being reset at the start of block 204, element 808 indicating the current time period of the current observation session, element 810 indicating the duration of the current observation session, element 812 representing the instantaneous RMS estimate from the RTK engines, element 814 representing the horizontal RMS of all of the RTK engines used in the current measurement, element 816 representing the vertical RMS of all of the RTK engines used in the current measurement, element 818 representing the current measurement number, element 820 representing the desired number of measurements (represented by N in FIG. 2), element 822 representing the vertical RMS for the current measurement, graphical representation 824 representing the vertical positions determined by the RTK engines, graphical representation 826 representing the horizontal positions determined by the RTK engines, element 828 representing the display scale of graphical representation 824, element 830 representing the display scale of graphical representation 826, element 832 representing the coordinates of the current position, element 834 representing a first determined horizontal position, element 836 representing a second (and previous) determined horizontal position, element 838 representing a third (and current) determined horizontal position, and element 840 representing a horizontal RMS for the current measurement.

In some examples, the number and identities of the RTK engines that provide a fixed solution for a given measurement may be indicative of how likely that measurement is to be correct. For example, if only one RTK engine provides a fixed solution over a set of measurements, there is a notable risk that a position determined using the output of that one RTK engine will be incorrect due to an incorrect RTK engine fix. This example is illustrated in FIG. 9, which graphically shows the results of five example measurements using six different RTK engines. The shaded boxes represent fixed solutions produced by an RTK engine for a particular measurement. The number of RTK engines producing a fixed solution for each measurement is indicated in the cells of the far right column. As shown, only RTK engine 1 produced a fixed solution during each of the five measurements (1-5). As such, the numbers shown in the far right column indicate that only one RTK engine produced a fixed solution for each of the five measurements (until the RTK engine is reset at the conclusion of the fifth measurement). The example shown in FIG. 9 is susceptible to producing an incorrect position determination due to an incorrect fix by RTK engine 1. For example, if an incorrect fix by RTK engine 1 occurs during the first measurement, this error may propagate through the remaining four measurements, resulting in each of the five measurements being incorrect.

Figure 10:
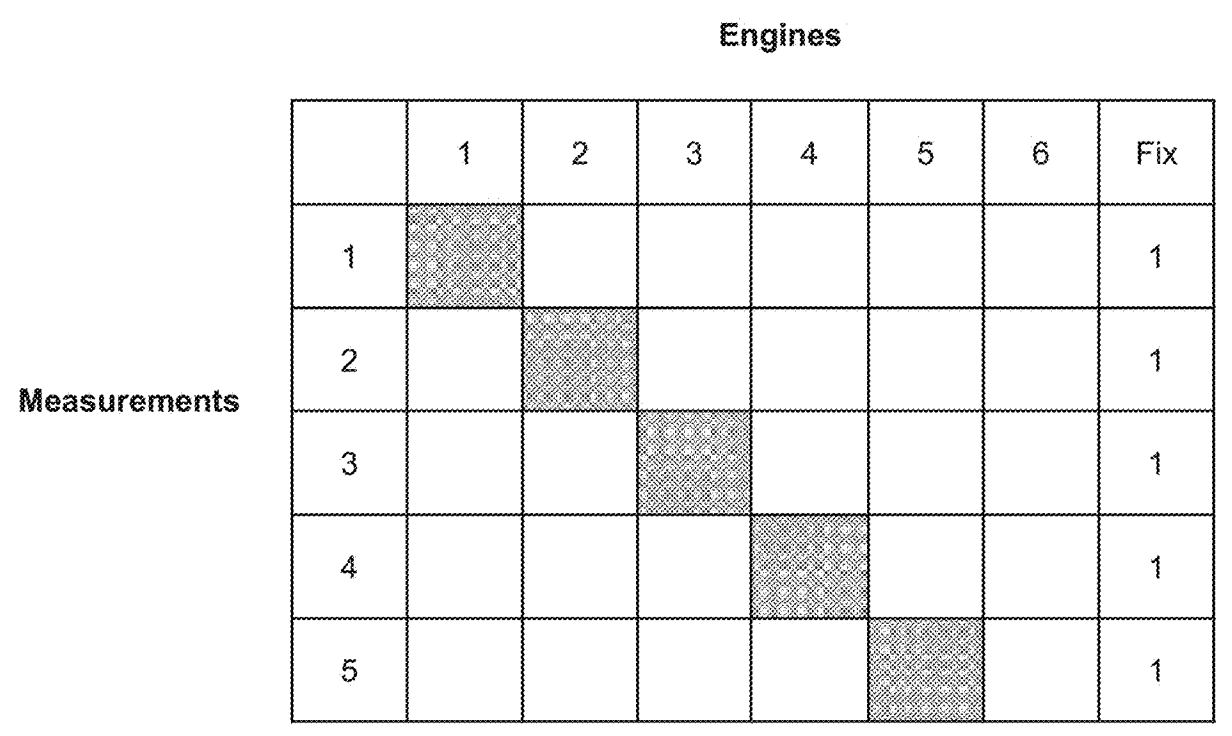

FIG. 10 illustrates another possible result of five example measurements performed using six different RTK engines. As shown, RTK engine 1 produced a fixed solution during the first measurement, RTK engine 2 produced a fixed solution during the second measurement, RTK engine 3 produced a fixed solution during the third measurement, RTK engine 4 produced a fixed solution during the fourth measurement, and RTK engine 5 produced a fixed solution during the fifth measurement. The example shown in FIG. 10 is less likely to result in an incorrect position determination than the example shown in FIG. 9 because it would require a greater number of incorrect fixes (5) by the RTK engines.

FIG. 11 illustrates another possible result of five example measurements performed using six different RTK engines. As shown, RTK engine 1 produced a fixed solution during the first measurement, RTK engines 1 and 2 produced a fixed solution during the second measurement, RTK engines 2 and 3 produced a fixed solution during the third measurement, RTK engines 1 and 2 produced a fixed solution during the fourth measurement, and RTK engines 3 and 4 produced a fixed solution during the fifth measurement. The example shown in FIG. 11 is less likely to result in an incorrect position determination than those shown in FIGS. 9 and 10 because some of the measurements depend on more than one RTK engine and because different RTK engines are producing fixed solutions between consecutive measurements.

Figure 12:
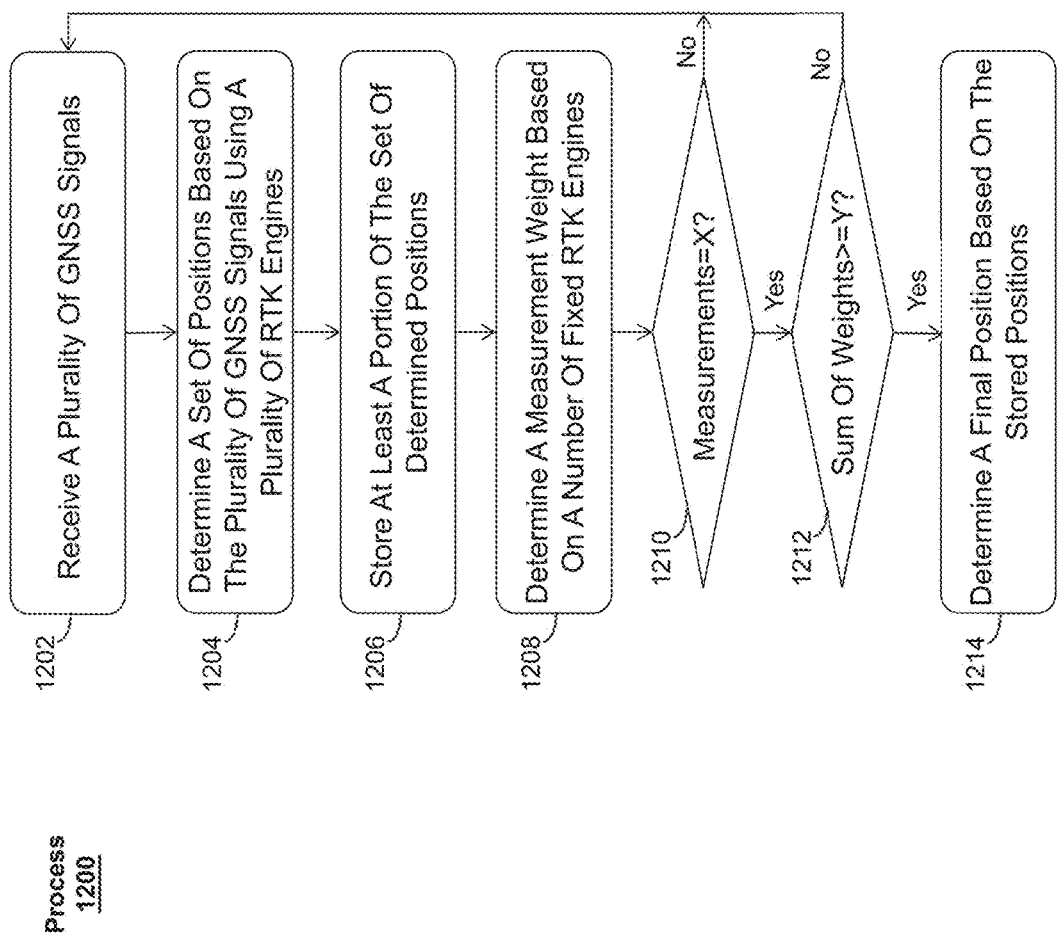
FIG. 12 illustrates another exemplary process for performing land surveying using RTK engine verification according to various examples.

In view of these factors that may impact the likelihood that a measurement produces a correct position determination, FIG. 12 illustrates another exemplary process 1200 for performing land surveying using RTK engine verification according to various examples. As discussed in greater detail below, process 1200 may assign weights to measurements based on the number and identity of the RTK engines that produced a fixed solution. The weights may represent the likelihood that the measurement produces a correct position determination. Using process 1200, sets of measurements may repeatedly be generated until the confidence level that the final position determination using the measurements is correct (e.g., based on a sum of the measurement weights reaching a threshold weight). In some examples, process 1200 may be performed by a GNSS device having a GNSS receiver and computing system similar or identical to GNSS receiver 100 and computing system 150.

At block 1202, a plurality of GNSS signals may be received by a GNSS device. The plurality of GNSS signals may include GNSS signals from any number of GPS and/or GLONASS satellites and may be received by an antenna (e.g., antenna 101) of a GNSS receiver similar or identical to GNSS receiver 100 of the GNSS device. The received GNSS signals may be processed using RF front-end circuitry of the GNSS receiver. For example, the GNSS signals may be amplified using an amplifier (e.g., low noise amplifier 104) to amplify the received GNSS signals. The amplified GNSS signals may be down-converted to baseband (or another intermediate frequency that depends on the entire receiver frequency plan design and available electronic components) using an oscillator (e.g., reference oscillator 128), a frequency synthesizer (e.g., frequency synthesizer 130), and a down-converter (e.g., down-converter 106). In some examples, an automatic gain control (e.g., AGC 109) may be used to adjust the amount of gain applied to the down-converted GNSS signals to a suitable level. The down-converted GNSS signals may also be converted from analog form to digital form using an analog-to-digital converter (e.g., ADC 108). The down-converted GNSS signals may further be demodulated and processed by channels of the GNSS receiver (e.g., channels 112 and 114).

At block 1202, a correction signal from at least one base station or network of base stations may also be received by the GNSS device. The correction signal may include correction information that may be used by each RTK engine implemented by the GNSS device to improve the accuracy of the position as determined using the plurality of GNSS signals. The correction signal may be received through, for example, a communications antenna mounted on the GNSS device and connected to a communications receiver or transceiver in the GNSS device (e.g., within communications interface 146).

At block 1204, a set of positions of the GNSS receiver may be determined using each of a plurality of RTK engines in accordance with their corresponding set of parameters and based on the correction signal and some or all of the plurality of GNSS signals received at block 1202. In some examples, six RTK engines may be used. However, it should be appreciated that any number of RTK engines may be used. The RTK engines may be implemented using an algorithm for computing position and executed on one or more processors (e.g., CPU 152).

In some examples, as discussed above with respect to FIG. 2, each of the plurality of RTK engines may include a different set of parameters and/or may implement a different algorithm for computing position. The set of parameters for a particular RTK engine may specify how the RTK engine should operate. In some examples, the sets of parameters may be loaded from memory of the GNSS device. In other examples, the sets of parameters may be obtained from the user through the use of a user interface of the GNSS device. Exemplary parameters that may be included in the sets of parameters may include parameters specifying: the number of satellites to consider in determining a position of the GNSS device, a fading factor, residual ionosphere estimator parameters, how outlier detection should be handled, the tolerances of the integer ambiguity validation procedure, and the like.

The sets of parameters and/or the algorithms for computing position may be selected for each RTK engine to cause the RTK engines to perform in a desired manner. For example, some configurations of an RTK engine may cause it to produce better results in open areas, while other configurations of an RTK engine may cause it to produce better results under trees. Any desired mix of RTK engines may be used.

An RTK engine may produce either an RTK Fixed position or an RTK Float position. Whether or not an RTK Fixed position is obtained may depend, in part, on the integer ambiguity validation procedure. The RTK engine may accept one or more parameters that affect the tolerances of the integer ambiguity validation procedure.

In some examples, in addition to determining the set of positions of the GNSS receiver using each of the plurality of RTK engines, an error indicator associated with each determined position may also be produced at block 1204. For example, the RTK engines may produce an RMS error. In other examples, the RTK engines may also indicate the type of solution or position it determined (e.g., float vs. fixed).

A more detailed description of determining a position based on signals from GNSS satellites and base stations is available in U.S. patent application Ser. No. 12/360,808, filed Jan. 27, 2009, published as U.S. Patent Publication No. 2009/0189804, assigned to the assignee of the present application, and which is incorporated herein by reference in its entirety for all purposes. Additionally, a more detailed description of determining a position using multiple RTK engines is available in U.S. patent application Ser. No. 13/437,366, filed Apr. 2, 2012, published as U.S. Patent Publication No. 2012/0256788, assigned to the assignee of the present application, and which is incorporated herein by reference in its entirety for all purposes.

At block 1206, at least a portion of the set of positions determined at block 1204 may be stored as a measurement. For example, the GNSS device may store the determined positions in memory 140 or storage device 144. In some examples, the position(s) stored at block 1206 may include an average of the positions determined by all RTK engines, a non-uniform weighted average of the positions determined by all RTK engines, an average of the positions determined by the fixed RTK engines, a non-uniform weighted average of the positions determined by the fixed RTK engines, the positions determined by each of the RTK engines, the positions determined by the RTK engines producing a fixed solution, or a position determined by one of the RTK engines.

At block 1208, a measurement weight may be determined for the measurement stored at block 1206 based on a number of RTK engines that produced a fixed result. In some examples, a weight may be assigned based on the number of new RTK engines that produce a fixed result (e.g., fixed RTK engines that did not produce a fixed solution in the previous measurement or RTK engines that produce a fixed solution after being reset). For example, if six RTK engines are used at block 1204, weights may be assigned to the number of new fixed RTK engines as follows: 1=1.00, 2=1.25, 3=1.50, 4=1.75, 5=2.00, and 6=2.50. However, it should be appreciated that any desired weight values may be assigned to the number of new fixed RTK engines based on the number of RTK engines being used, the desired confidence in producing a correct solution, the threshold weight (discussed below with respect to block 1212), and the like.

At block 1210, it may be determined whether the number of measurements (e.g., number of times block 1206 is performed without resetting the RTK engines) is equal to a threshold number of measurements (represented by "X" in FIG. 12). The threshold number of measurements represents the number of measurements that may be generated before determining whether a sufficient number of measurements have been generated. In the example shown in FIG. 13, the threshold number of measurements is equal to 5. However, it should be appreciated that the threshold number of measurements may be set to any desired value. If it is determined that the number of measurements is not equal to the threshold number of measurements, blocks 1202, 1204, 1206, and 1208 may be repeated to generate and store an additional measurement and to assign a weight to the measurement based on the number of new fixed RTK engines for that measurement. Blocks 1202, 1204, 1206, 1208, and 1210 may be repeated until the number of measurements generated is equal to the threshold number of measurements.

Once the number of measurements generated is equal to the threshold number of measurements, a positive determination may be made at block 1210 and the process may proceed to block 1212. At block 1212, it may be determined whether the sum of weights assigned to all previously generated measurements is greater than or equal to a threshold weight. In some examples, the weight may have a value of 4. However, it should be appreciated that the threshold weight may have any value depending on the weights assigned to the number of new RTK engines and the desired confidence in producing a correct solution. If it is determined that the sum of weights is not greater than or equal to the threshold weight, the RTK engines may be reset and process 1200 may return to block 1202 where another set of measurements equal to the threshold number of measurements may be generated. Blocks 1202, 1204, 1206, 1208, 1210, and 1212 may be repeated until the sum of weights of all measurements is greater than or equal to the threshold weight.

Once the sum of weights is greater than or equal to the threshold weight, a positive determination may be made at block 1212, causing process 1200 to proceed to block 1214.

At block 1214, a final position may be determined based on the positions stored at block 1206. In some examples, determining the final position may include calculating an average of the stored position determinations. In other examples, a weighted average may be calculated based on the weights assigned at block 1208. However, it should be appreciated that the final position may be determined based on the stored position determinations in any other desired manner (e.g., selecting one of the stored measurements, etc.).

In some examples, the final position determined at block 1214 may be stored on the GNSS device. In other examples, the GNSS device may present the final position to the user (e.g., display to the user) to allow the user to accept or reject the position determination. If the user accepts the position determination, the GNSS device may store the measurement. If the user rejects the position determination, the GNSS device may discard the measurement.

Using process 1200, measurements may automatically be generated until reaching a confidence threshold that the final position determined using the measurements is correct. For example, the confidence threshold may be set to 99.999999%, and the weights assigned to the number of new RTK engines at block 1208 and the threshold weight at block 1212 may be assigned accordingly to cause block 1214 to be performed only when a confidence equal to or greater than the confidence threshold is reached.

To illustrate the operation of process 1200, FIG. 13 shows the results of five example measurements using six different RTK engines (similar to that shown in FIG. 9). At blocks 1202, 1204, and 1206, GNSS signals may be received by GNSS receiver 100 and six RTK engines may be used to determine the position of the receiver. Some or all of the positions determined using the RTK engines may be stored. As shown in FIG. 13, during this first measurement, only RTK engine 1 produced a fixed solution. Since this was the first measurement, the number of new RTK engines that produced a fixed result is equal to 1. Thus, a weight of 1 may be determined for the first measurement at block 1208. At block 1210, it may be determined that the number of measurements generated (1) is not equal to the threshold number of measurements (e.g., 5). Thus, blocks 1202, 1204, 1206, and 1208 are repeated to generate another measurement and to determine an appropriate weight. As shown in FIG. 13, during the second measurement, the same RTK engine 1 produced a fixed solution. Thus, the number of new fixed RTK engines for measurement 2 is equal to 0. As a result, a weight of 0 may be assigned to measurement 2. Blocks 1202, 1204, 1206, and 1208 may continue to be repeated until the threshold umber of measurements are generated (e.g., 5 measurements). Since the same RTK engine 1 produced a fixed solution in the remaining third, fourth, and fifth measurements, the number of new RTK engines for these measurements is equal to 0. As a result, a weight of 0 may also be assigned to these measurements. The weights assigned to each measurement are listed in the far right column under the header "Wt."

At block 1212, it may be determined that the sum of weights (1+0+0+0+0=1) is not greater than the threshold weight (e.g., 4). As a result, the RTK engines may be reset and process 1200 may return to block 1202.

FIG. 14 shows the results of another five example measurements using six different RTK engines (similar to that shown in FIG. 10) that may be generated after those of FIG. 13. During the first measurement (e.g., by performing blocks 1202, 1204, and 1206), only RTK engine 1 produces a fixed solution. Since the RTK engines were reset after the negative determination at block 1212, RTK engine 1 may be considered a new fixed RTK engine. Thus, a weight of 1 may be determined for the first measurement at block 1208. At block 1210, it may be determined that the number of measurements generated since the last reset (1) is not equal to the threshold number of measurements (e.g., 5). Thus, blocks 1202, 1204, 1206, and 1208 may be repeated to generate another measurement and to determine an appropriate weight. As shown in FIG. 14, during the second measurement, RTK engine 2 produces a fixed solution. Since RTK engine 2 did not previously produce a fixed solution during measurement 1, RTK engine 2 may be considered a new RTK engine. Thus, a weight of 1 may be determined for the second measurement at block 1208. Blocks 1202, 1204, 1206, and 1208 may continue to be repeated until the threshold umber of measurements are generated (e.g., 5 measurements). For each of measurements 3, 4, and 5, an RTK engine that did not produce a fixed solution in the previous measurement (e.g., RTK engines 3, 4, and 5) resulted in a fixed solution. Thus, the number of new RTK engines for these measurements is equal to 1. As a result, a weight of 1 may also be assigned to these measurements. The weights assigned to each measurement are listed in the far right column under the header "Wt."

At block 1212, it may be determined that the sum of weights from all previous sets of measurements (weight of 1 produced by the results shown in FIG. 13) and the most recent set of measurements (1+1+1+1+1=5) is greater than the threshold weight (e.g., 4). As a result, a positive determination may be made at block 1212 and the process may proceed to block 1214, where a final position may be determined using the stored positions as discussed above.

FIGS. 15-17 show other example measurement results using six different RTK engines and are described below to further illustrate the process of determining a weight for a measurement. For example, FIG. 15 shows the results of another five example measurements using six different RTK engines (similar to that shown in FIG. 11). During the first measurement, only RTK engine 1 produces a fixed solution. Since measurement 1 is the first measurement, RTK engine 1 may be considered a new fixed RTK engine. Thus, a weight of 1 may be determined for the first measurement. During the second measurement, both RTK engines 1 and 2 produce a fixed solution. However, since RTK engine 2 is the only RTK engine of the two that did not produce a fixed solution during measurement 1, only RTK engine 2 may be considered a new fixed RTK engine. Thus, a weight of 1 may also be determined for the second measurement. During the third measurement, both RTK engines 2 and 3 produce a fixed solution. However, since RTK engine 3 is the only RTK engine of the two that did not produce a fixed solution during measurement 2, only RTK engine 3 may be considered a new fixed RTK engine. Thus, a weight of 1 may also be determined for the third measurement. During the fourth measurement, both RTK engines 1 and 2 produce a fixed solution. However, since RTK engine 1 is the only RTK engine of the two that did not produce a fixed solution during measurement 3, only RTK engine 1 may be considered a new fixed RTK engine. Thus, a weight of 1 may also be determined for the fourth measurement. During the fifth measurement, both RTK engines 3 and 4 produce a fixed solution. Since both RTK engines did not produce a fixed solution during measurement 4, both RTK engines 3 and 4 may be considered new fixed RTK engines. Thus, a weight of 1.25 may be determined for the fifth measurement.

FIG. 16 shows the results of another five example measurements using six different RTK engines. During the first measurement, RTK engines 1, 2, 3, and 4 produce a fixed solution. Since measurement 1 is the first measurement, all four RTK engines may be considered a new fixed RTK engine. Thus, a weight of 1.75 may be determined for the first measurement. During the second measurement, RTK engines 3, 4, 5, and 6 produce a fixed solution. However, since RTK engines 5 and 6 are the only RTK engines of the four that did not produce a fixed solution during measurement 1, only RTK engines 5 and 6 may be considered new fixed RTK engines. Thus, a weight of 1.25 may be determined for the second measurement. During the third measurement, RTK engines 1, 2, 3, and 4 produce a fixed solution. However, since RTK engines 1 and 2 are the only RTK engines of the four that did not produce a fixed solution during measurement 2, only RTK engines 1 and 2 may be considered new fixed RTK engines. Thus, a weight of 1.25 may be determined for the third measurement. During the fourth measurement, RTK engines 2, 3, 4, and 5 produce a fixed solution. However, since RTK engine 5 is the only RTK engine of the four that did not produce a fixed solution during measurement 3, only RTK engine 5 may be considered a new fixed RTK engine. Thus, a weight of 1 may be determined for the fourth measurement. During the fifth measurement, RTK engines 2, 3, 4, and 6 produce a fixed solution. However, since RTK engine 6 is the only RTK engine of the four that did not produce a fixed solution during measurement 4, only RTK engine 6 may be considered a new fixed RTK engine. Thus, a weight of 1 may be determined for the fifth measurement.

FIG. 17 shows the results of another five example measurements using six different RTK engines. During the first measurement, only RTK engine 1 produces a fixed solution. Since measurement 1 is the first measurement, RTK engine 1 may be considered a new fixed RTK engine. Thus, a weight of 1 may be determined for the first measurement. During the second measurement, only RTK engine 2 produces a fixed solution. Since RTK engine 2 did not produce a fixed solution during measurement 1, RTK engine 2 may be considered a new fixed RTK engine. Thus, a weight of 1 may also be determined for the second measurement. During the third measurement, only RTK engine 1 produces a fixed solution. Since RTK engine 1 did not produce a fixed solution during measurement 1, RTK engine 1 may be considered a new fixed RTK engine. Thus, a weight of 1 may also be determined for the third measurement. During the fourth measurement, only RTK engine 2 produces a fixed solution. Since RTK engine 2 did not produce a fixed solution during measurement 3, RTK engine 2 may be considered a new fixed RTK engine. Thus, a weight of 1 may also be determined for the fourth measurement. During the fifth measurement, only RTK engine 1 produces a fixed solution. Since RTK engine 1 did not produce a fixed solution during measurement 4, RTK engine 1 may be considered a new fixed RTK engine. Thus, a weight of 1 may also be determined for the fifth measurement.

Figure 18:
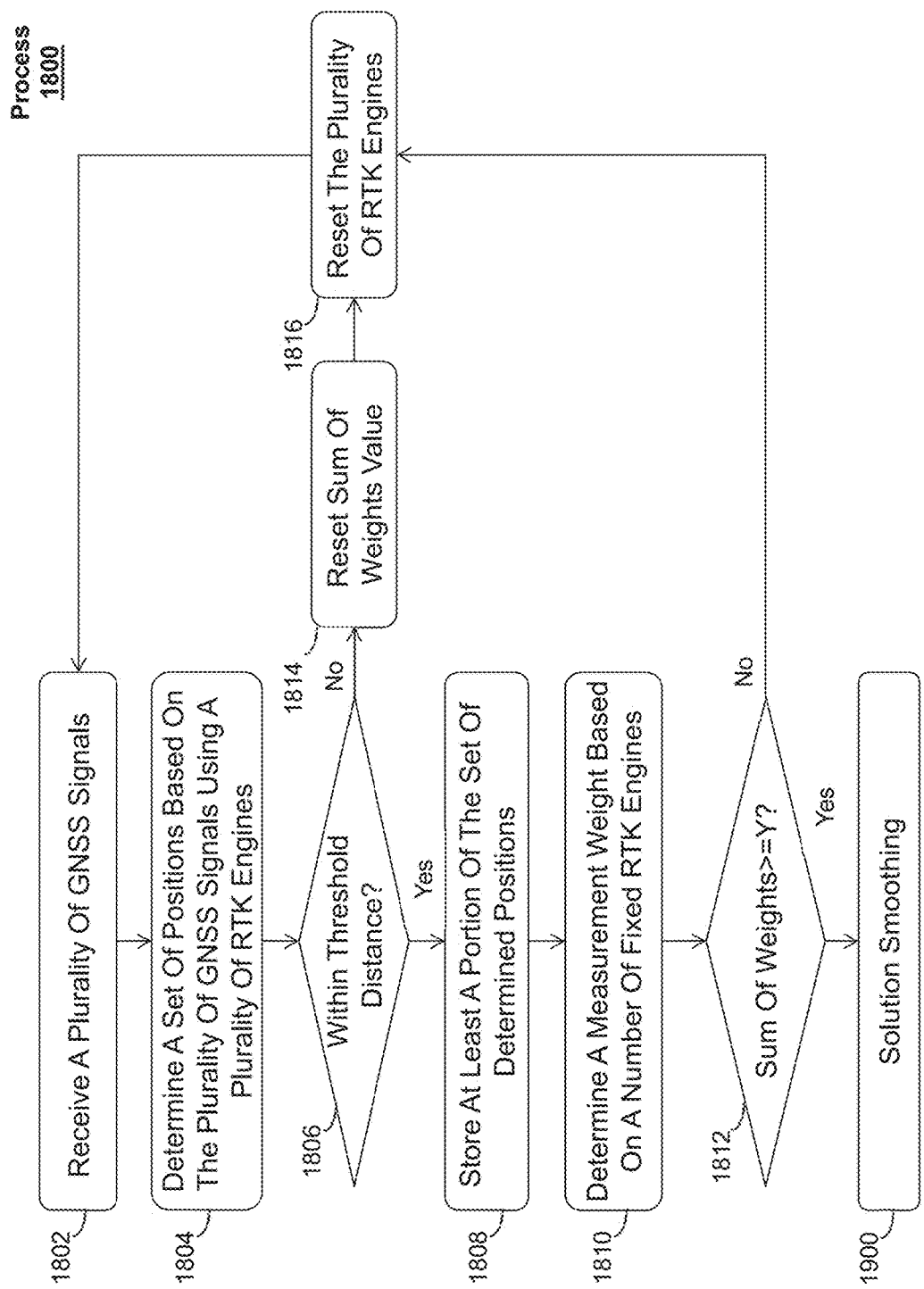
FIGS. 18 and 19 illustrate another exemplary process for performing land surveying using RTK engine verification according to various examples.
Figure 19:
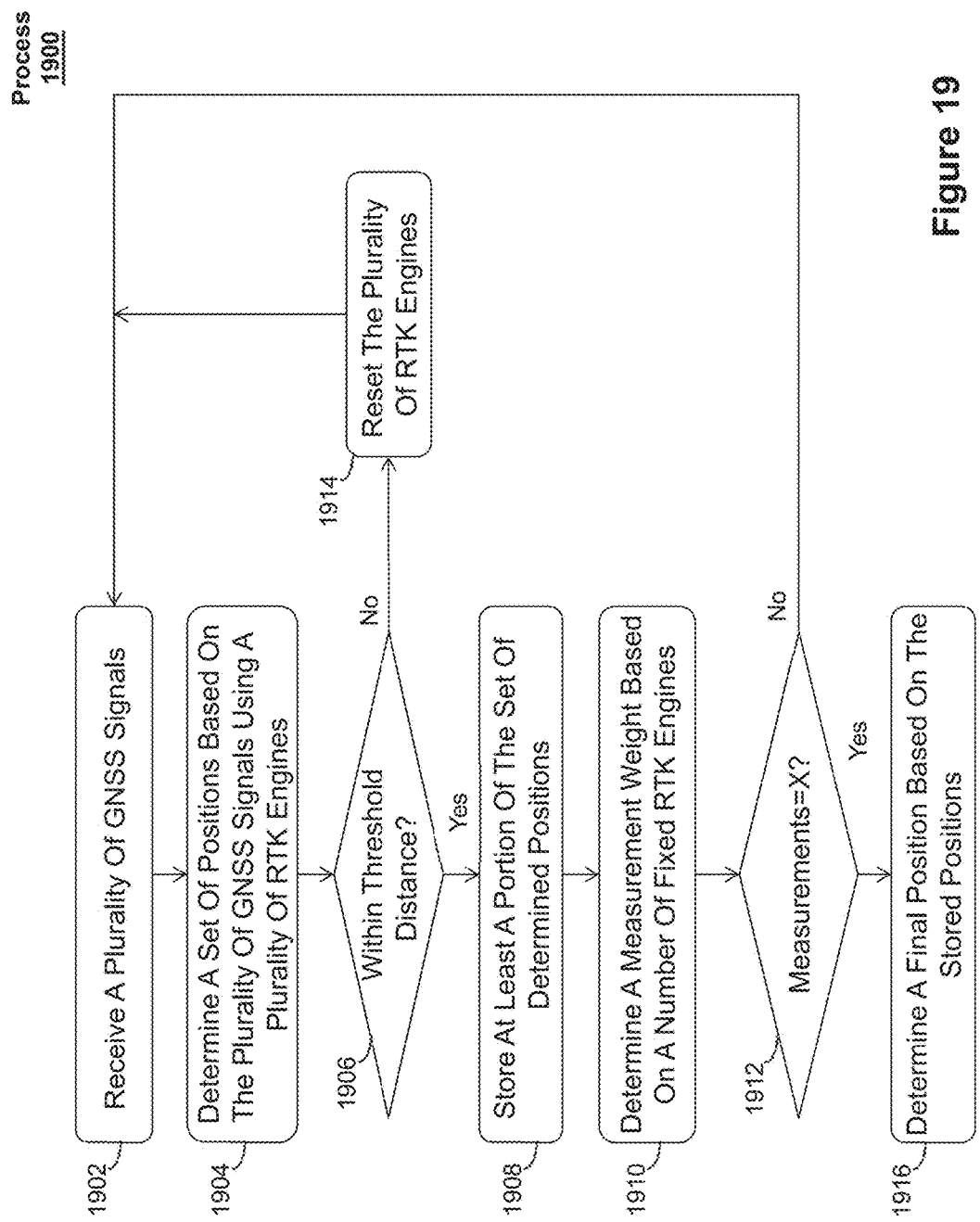

FIGS. 18 and 19 illustrate another exemplary process for performing land surveying using RTK engine verification according to various examples. As discussed in greater detail below, the process may include two phases represented by processes 1800 and 1900. During the first phase (represented by process 1800), an estimated position may be generated based on multiple position measurements made using a plurality of RTK engines. Between each measurement, the RTK engines may be reset. Measurements that are located within a threshold distance from each other may be recorded and used to generate the estimated position. Weights may be assigned to these measurements based on the number and identity of the RTK engines that produced a fixed solution. Using process 1800, measurements may repeatedly be generated by resetting the RTK engines until a confidence level that the estimated position is correct (e.g., based on a sum of the measurement weights reaching a threshold weight). Once process 1800 is complete, the second phase represented by process 1900 may be performed. During the second phase, the estimated position generated using process 1800 may be updated using newly acquired measurements that are located with a threshold distance from the most recently updated estimated position. These newly acquired measurements may be generated without resetting the RTK engines to reduce the length of time required to produce the measurements. Measurements that are not located within the threshold distance from the most recently updated estimated position may be discarded and may trigger a reset of the RTK engines. In some examples, processes 1800 and 1900 may be performed by a GNSS device having a GNSS receiver and computing system similar or identical to GNSS receiver 100 and computing system 150.

Referring now FIG. 18, block 1802 of process 1800 may include receiving a plurality of GNSS signals by a GNSS device in a manner similar or identical to block 1202 of process 1200. Additionally, in some examples, a correction signal from at least one base station or network of base stations may also be received by the GNSS device at block 1802. The correction signal may include correction information that may be used by each RTK engine implemented by the GNSS device to improve the accuracy of the position as determined using the plurality of GNSS signals. The correction signal may be received through, for example, a communications antenna mounted on the GNSS device and connected to a communications receiver or transceiver in the GNSS device (e.g., within communications interface 146).

At block 1804, a set of positions of the GNSS receiver may be determined in a manner similar or identical to block 1204 of process 1200. For example, the set of positions may be determined using each of a plurality of RTK engines in accordance with their corresponding set of parameters and based on the correction signal and some or all of the plurality of GNSS signals received at block 1802. In some examples, six RTK engines may be used. However, it should be appreciated that any number of RTK engines may be used. The RTK engines may be implemented using an algorithm for computing position and executed on one or more processors (e.g., CPU 152).

At block 1806, it may be determined whether the set of positions determined at block 1804 are within a threshold distance from one or more previously determined positions. In some examples, block 1806 can include determining whether an average of the positions determined by all RTK engines, a non-uniform weighted average of the positions determined by all RTK engines, an average of the positions determined by the fixed RTK engines, a non-uniform weighted average of the positions determined by the fixed RTK engines, the positions determined by each of the RTK engines, the positions determined by the RTK engines producing a fixed solution, or a position determined by one of the RTK engines at block 1804 is within the threshold distance from the one or more previously determined positions. The one or more previously determined positions may include one or more previous positions determined using process 1800, an average of some or all of the previous positions determined using process 1800, a weighted average of some or all of the previous positions determined using process 1800, some or all of the positions stored at block 1808, an average or weighted average of some or all of the positions stored at block 1808, an estimated position determined based on any of the previously recited positions, or the like. In some examples, the threshold distance may be 5 cm. However, it should be appreciated that the threshold distance may be any desired distance depending on an acceptable tolerance between measurements for a particular application.

If it is determined at block 1806 that the set of positions are not within the threshold distance from the one or more previously determined positions, process 1800 may proceed to block 1814 where a weight counter representing a sum of the weights associated with previously determined measurements may be reset (e.g., to zero). Additionally, the measurements stored at block 1808, if any, may be deleted or ignored for purposes of performing process 1800. At block 1816, the plurality of RTK engines may be reset and the process may return to block 1802.

Alternatively, if it is determined at block 1806 that the set of positions determined at block 1804 are within the threshold distance from the one or more previously determined positions or if it is the first iteration of process 1800, process 1800 may proceed to block 1808. At block 1808, at least a portion of the set of positions determined at block 1804 may be stored as a measurement. For example, the GNSS device may store the determined positions in memory 140 or storage device 144. In some examples, the position(s) stored at block 1806 may include an average of the positions determined by all RTK engines, a non-uniform weighted average of the positions determined by all RTK engines, an average of the positions determined by the fixed RTK engines, a non-uniform weighted average of the positions determined by the fixed RTK engines, the positions determined by each of the RTK engines, the positions determined by the RTK engines producing a fixed solution, or a position determined by one of the RTK engines. In some examples, block 1808 can further include determining or updating an estimated position based on the stored measurements. The estimated position may include an average of the stored measurements, a weighted average of the stored measurements, or the like.

At block 1810, a measurement weight may be determined for the measurement stored at block 1808 based on a number of RTK engines that produced a fixed result in a manner similar or identical to that of block 1208 of process 1200. For example, a weight may be assigned based on the number of new RTK engines that produce a fixed result (e.g., fixed RTK engines that did not produce a fixed solution in the previous measurement or RTK engines that produce a fixed solution after being reset). To illustrate, if six RTK engines are used at block 1804, weights may be assigned to the number of new fixed RTK engines as follows: 1=1.00, 2=1.25, 3=1.50, 4=1.75, 5=2.00, and 6=2.50. However, it should be appreciated that any desired weight values may be assigned to the number of new fixed RTK engines based on the number of RTK engines being used, the desired confidence in producing a correct solution, the threshold weight (discussed below with respect to block 1812), and the like.

At block 1812, it may be determined whether the weight counter representing the sum of weights assigned to all previously generated measurements is greater than or equal to a threshold weight (represented by Y in FIG. 18). The threshold weight may be the same or different than the threshold weight used at block 1212 of process 1200. For example, the threshold weight may have a value of 5. However, it should be appreciated that the threshold weight may have any value depending on the weights assigned to the number of new RTK engines and the desired confidence in producing a correct solution. If it is determined that the value of the weight counter is not greater than or equal to the threshold weight, process 1800 may proceed to block 1816 where the RTK engines may be reset. After resetting the RTK engines at block 1816, process 1800 may return to block 1802. Blocks 1802, 1804, 1806, 1808, 1810, 1812, 1814, and 1816 may be repeated until the value of the weight counter is greater than or equal to the threshold weight. Once the value of the weight counter is greater than or equal to the threshold weight, a positive determination may be made at block 1812, causing process 1800 to proceed to process 1900.

Referring now to FIG. 19, block 1902 of process 1900 can include receiving a plurality of GNSS signals by a GNSS device in a manner similar or identical to block 1202 of process 1200 or 1802 of process 1800. In some examples, a correction signal from at least one base station or network of base stations may also be received by the GNSS device at block 1902. The correction signal may include correction information that may be used by each RTK engine implemented by the GNSS device to improve the accuracy of the position as determined using the plurality of GNSS signals. The correction signal may be received through, for example, a communications antenna mounted on the GNSS device and connected to a communications receiver or transceiver in the GNSS device (e.g., within communications interface 146).

At block 1904, a set of positions of the GNSS receiver may be determined in a manner similar or identical to block 1204 of process 1200 or block 1804 of process 1800. For example, the set of positions may be determined using each of a plurality of RTK engines in accordance with their corresponding set of parameters and based on the correction signal and some or all of the plurality of GNSS signals received at block 1902. In some examples, six RTK engines may be used. However, it should be appreciated that any number of RTK engines may be used. The RTK engines may be implemented using an algorithm for computing position and executed on one or more processors (e.g., CPU 152).

At block 1906, it may be determined whether the set of positions determined at block 1904 are within a threshold distance from one or more previously determined positions in a manner similar or identical to block 1806 of process 1800. For example, block 1906 can include determining whether an average of the positions determined by all RTK engines, a non-uniform weighted average of the positions determined by all RTK engines, an average of the positions determined by the fixed RTK engines, a non-uniform weighted average of the positions determined by the fixed RTK engines, the positions determined by each of the RTK engines, the positions determined by the RTK engines producing a fixed solution, or a position determined by one of the RTK engines at block 1904 is within the threshold distance from the one or more previously determined positions. The one or more previously determined positions may include the estimated position determined at block 1808 of process 1800, one or more previous positions determined using process 1800 and/or 1900, an average of some or all of the previous positions determined using process 1800 and/or 1900, a weighted average of some or all of the previous positions determined using process 1800 and/or 1900, some or all of the positions stored at block 1808 and/or 1908, an average or weighted average of some or all of the positions stored at block 1808 and/or 1908, or the like. In some examples, the threshold distance may be the same or different than the threshold distance used at block 1806 of process 1800. For example, the threshold distance may be 5 cm. However, it should be appreciated that the threshold distance may be any desired distance.

If it is determined at block 1906 that the set of positions determined at block 1904 are not within the threshold distance from the one or more previously determined positions, process 1900 may proceed to block 1914 where plurality of RTK engines may be reset and the process may return to block 1902. The RTK engines may be reset in this instance because the most recently generated solution was not within the threshold distance from the current estimated position. As a result, it is possible that the RTK engines are not operating properly and are producing an incorrect solution. The RTK engines may be reset in these instances in an attempt to correct any problems associated with the RTK engines.

In some examples, if a threshold number or percentage of sets of positions are determined at block 1906 to not be within the threshold distance from the one or more previously determined positions, process 1900 may return to block 1802 of process 1800. Since the occurrence of this condition may be indicative of a problem with the solutions generated by the RTK engines, the position determinations made using processes 1800 and 1900 may be discarded and the processes started again from the beginning. In some examples, the threshold number or percentage can be 30%. However, it should be appreciated that any other number or percentage can be used.

Alternatively, if it is determined at block 1906 that the set of positions determined at block 1904 are within the threshold distance from the one or more previously determined positions, process 1900 may proceed to block 1908. At block 1908, at least a portion of the set of positions determined at block 1904 may be stored as a measurement. For example, the GNSS device may store the determined positions in memory 140 or storage device 144. In some examples, the position(s) stored at block 1908 may be combined with the position(s) stored at block 1808 and may include an average of the positions determined by all RTK engines, a non-uniform weighted average of the positions determined by all RTK engines, an average of the positions determined by the fixed RTK engines, a non-uniform weighted average of the positions determined by the fixed RTK engines, the positions determined by each of the RTK engines, the positions determined by the RTK engines producing a fixed solution, or a position determined by one of the RTK engines. In some examples, block 1908 can further include updating the estimated position determined at block 1808 of process 1800 based on the newly stored measurements. Updating the estimated position may include calculating an updated average of the stored measurements (including the newly stored measurement), calculating an updated weighted average of the stored measurements (including the newly stored measurement), or the like.

At block 1910, a measurement weight may be determined for the measurement stored at block 1908 based on a number of RTK engines that produced a fixed result in a manner similar or identical to that of block 1208 of process 1200 or block 1810 of process 1800. For example, a weight may be assigned based on the number of new RTK engines that produce a fixed result (e.g., fixed RTK engines that did not produce a fixed solution in the previous measurement or RTK engines that produce a fixed solution after being reset). To illustrate, if six RTK engines are used at block 1904, weights may be assigned to the number of new fixed RTK engines as follows: 1=1.00, 2=1.25, 3=1.50, 4=1.75, 5=2.00, and 6=2.50. However, it should be appreciated that any desired weight values may be assigned to the number of new fixed RTK engines based on the number of RTK engines being used, the desired confidence in producing a correct solution, the threshold weight, and the like. In some examples, the determined weight may be added to the weights assigned to all previously generated measurements of process 1800 and/or 1900.

At block 1912, it may be determined whether the number of measurements (e.g., number of measurements stored at block 1808 and/or 1908) is equal to a threshold number of measurements (represented by "X" in FIG. 19). The threshold number of measurements represents the number of measurements that may be generated before determining a final position solution. The threshold number of measurements may be the same or different than the threshold number of measurements used at block 1210 of process 1200. For example, the threshold number of measurements may be 120. However, it should be appreciated that the threshold number of measurements may be set to any desired value. If it is determined that the number of measurements is not equal to the threshold number of measurements, process 1900 may return to block 1902 without resetting the RTK engines at block 1914. The RTK engines may not be reset in order to reduce the length of time required by the RTK engines to produce a solution. Since the most recently generated solution was within the threshold distance from the current estimated position, it is highly likely that the RTK engines are operating properly and producing a correct solution. As a result, the RTK engines may not be reset. Blocks 1902, 1904, 1906, 1908, 1910, 1912, and 1914 may be repeated until the number of measurements generated is equal to the threshold number of measurements.

Once the number of measurements generated is equal to the threshold number of measurements, a positive determination may be made at block 1912 and the process may proceed to block 1916. At block 1916, a final position may be determined based on the positions stored at block 1808 and/or 1908. In some examples, determining the final position may include calculating an average of the stored position determinations. In other examples, a weighted average may be calculated based on the weights assigned at block 1810 and/or 1910. However, it should be appreciated that the final position may be determined based on the stored position determinations in any other desired manner (e.g., selecting one of the stored measurements, etc.).

In some examples, the final position determined at block 1916 may be stored on the GNSS device. In other examples, the GNSS device may present the final position to the user (e.g., display to the user) to allow the user to accept or reject the position determination. If the user accepts the position determination, the GNSS device may store the measurement. If the user rejects the position determination, the GNSS device may discard the measurement. In some examples, the sum of the weights assigned to all previously generated measurements of process 1800 and/or 1900 at block 1810 and/or 1910 may be displayed to the user to provide an indication of reliability of the determined final position.

Using processes 1800 and 1900, a position determination may automatically be generated quickly and reliably. For example, process 1800 may be used to generate an estimated position using independent RTK solutions (since the RTK engines may be reset between each measurement). While using independent RTK solutions may be time consuming, the estimated position may be generated with a relatively high level of confidence that the solution is correct. Process 1900 may then be used to quickly obtain additional measurements in order to update the estimated position to average out noise. In particular, if the measurements are within a threshold distance from the current estimated position, the RTK engines are likely producing a correct solution and the measurements may be used to update the estimated position without resetting the RTK engines. This advantageously reduces the length of time required to produce the additional measurements. However, if a generated measurement is not within the threshold distance from the current estimated position, it is possible that the RTK solution is incorrect and the measurement may be discarded and the RTK engines may be reset in an attempt to correct the problem. This advantageously increases the likelihood that the measurements used to update the estimated position are correct.

Processes 1800 and 1900 allow a user to adjust the number of slower, independent RTK solutions needed to generate the estimated position using process 1800 to produce an estimated position with a desired level of confidence that the solution is correct and to adjust the number of measurements obtained using process 1900 to provide a sufficient number of measurements to average potential noise. By configuring processes 1800 and 1900 to cause a larger number of measurements to be obtained using process 1900, a final position determination can be made more quickly than if all measurements were obtained using independent RTK solutions.

While processes 1800 and 1900 are described above as being performed together, it should be appreciated that each process may be performed separately on its own. For example, process 1800 may be performed without performing process 1900 to determine the position of the GNSS receiver using only independent RTK solutions by resetting the RTK engines between each measurement. In this example, rather than perform block 1900 after making a positive determination at block 1812, a final position determination similar to that of block 1916 of process 1900 may be performed using the independent RTK solutions. While resetting the RTK engines between each measurement may be a time consuming process, the resulting position determination may be made with a high level of confidence. Similarly, process 1900 may be performed without previously performing process 1800 to quickly obtain a desired number of position measurements. For example, process 1900 may repeatedly be performed to obtain multiple position measurements while only resetting the RTK engines in response to detecting a measurement that is not within a threshold distance from one or more or an average of the previous measurements. While obtaining measurements without resetting the RTK engines may result in a lower level of confidence in the resulting position determination, measurements may be obtained more quickly.

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method for determining a position of a GNSS receiver, the method comprising:
    determining whether a plurality of position measurements from a plurality of real-time kinematic (RTK) engines are within a first threshold distance from previously determined positions, from the plurality of RTK engines;
    in accordance with a determination that the plurality of position measurements are not within the first threshold distance:
       resetting one or more of the plurality of RTK engines;
       after resetting one or more of the plurality of RTK engines, determining a plurality of additional position measurements using the plurality of RTK engines;
       determining the position of the GNSS receiver based on the plurality of additional position measurements and the previously determined positions; and
    in accordance with a determination that the plurality of position measurements are within the first threshold distance:
       determining the position of the GNSS receiver based on the plurality of position measurements and the plurality of previously determined positions.

2. The method of claim 1, wherein determining the plurality of position measurements comprises:
    (a) receiving position signals from a plurality of GNSS satellites and at least one base station;
    (b) determining a set of positions of the GNSS receiver using the plurality of RTK engines based on the received position signals; and
    (c) determining whether the set of positions is within the first threshold distance from previously determined positions, wherein in response to determining that the set of positions is within the first threshold distance from the previously determined positions:
  storing at least a portion of the set of positions as a position measurement;
  determining a plurality of weights associated with the position measurement based on a number of RTK engines among the plurality of RTK engines producing a fixed solution that did not produce a fixed solution in a previous measurement or that produced a fixed solution after being reset;
  determining whether a sum of the plurality of weights is greater than a threshold weight, wherein determining the plurality of additional position measurements using the plurality of RTK engines is performed in response to determining that the sum of the plurality of weights is greater than the threshold weight, and wherein in response to determining that the sum of the plurality of weights is not greater than the threshold weight, resetting the plurality of RTK engines and repeating steps (a)-(c).

3. The method of claim 2, wherein determining whether the set of positions is within the first threshold distance from previously determined positions further comprises:
  in response to determining that the set of positions is not within the first threshold distance from the previously determined positions:
    resetting the sum of the plurality of weights; and
    resetting the plurality of RTK engines.

4. The method of claim 3, wherein the at least a portion of the set of positions comprises outputs from the RTK engines of the plurality of RTK engines that produce a fixed solution.

5. The method of claim 1, wherein determining the plurality of additional position measurements comprises:
  (d) receiving position signals from a plurality of GNSS satellites and at least one base station;
  (e) determining a set of positions of the GNSS receiver using the plurality of RTK engines based on the received position signals; and
  (f) determining whether the set of positions is within the threshold distance from previously determined positions, wherein in response to determining that the set of positions is within the threshold distance from the previously determined positions:
    storing at least a portion of the set of positions as a position measurement; and
    determining a plurality of weights associated with the position measurement based on a number of RTK engines among the plurality of RTK engines producing a fixed solution that did not produce a fixed solution in a previous measurement or that produced a fixed solution after being reset.

6. The method of claim 5, wherein determining whether the set of positions is within the threshold distance from previously determined positions further comprises:
  in response to determining that the set of positions is not within the threshold distance from the previously determined positions, resetting the plurality of RTK engines and repeating steps (d)-(f).

7. The method of claim 6, wherein the at least a portion of the set of positions comprises outputs from the RTK engines of the plurality of RTK engines that produce a fixed solution.

8. The method of claim 1, wherein each of the plurality of RTK engines comprises a different set of parameters.

9. A non-transitory computer-readable storage medium encoded with computer executable instructions for:
  determining whether a plurality of position measurements from a plurality of real-time kinematic (RTK) engines are within a first threshold distance from previously determined positions, from the plurality of RTK engines;
  in accordance with a determination that the plurality of position measurements are not within the first threshold distance:
    resetting one or more of the plurality of RTK engines;
    after resetting one or more of the plurality of RTK engines, determining a plurality of additional position measurements using the plurality of RTK engines;
    determining the position of the GNSS receiver based on the plurality of additional position measurements and the previously determined positions; and
  in accordance with a determination that the plurality of position measurements are within the first threshold distance:
    determining the position of the GNSS receiver based on the plurality of position measurements and the plurality of previously determined positions.

10. The non-transitory computer-readable storage medium of claim 9, wherein instructions for determining the plurality of position measurements comprises instructions for:
  (a) receiving position signals from a plurality of GNSS satellites and at least one base station;
  (b) determining a set of positions of the GNSS receiver using the plurality of RTK engines based on the received position signals;
  (c) determining a number of fixed RTK engines based on the number of RTK engines that produce a fixed solution; and
  (d) determining whether the set of positions is within the first threshold distance from previously determined positions, wherein in response to determining that the set of positions is within the first threshold distance from the previously determined positions:
    storing at least a portion of the set of positions as a position measurement;
    determining a plurality of weights associated with the position measurement based on a number of RTK engines among the plurality of RTK engines producing a fixed solution that did not produce a fixed solution in a previous measurement or that produced a fixed solution after being reset;
    determining whether a sum of the plurality of weights is greater than a threshold weight, wherein determining the plurality of additional position measurements using the plurality of RTK engines is performed in response to determining that the sum of the plurality of weights is greater than the threshold weight, and wherein in response to determining that the sum of the plurality of weights is not greater than the threshold weight, resetting the plurality of RTK engines and repeating steps (a)-(c).

11. The non-transitory computer-readable storage medium of claim 10, wherein instructions for determining whether the set of positions is within the first threshold distance from previously determined positions further comprises instructions for:
  in response to determining that the set of positions is not within the first threshold distance from the previously determined positions:
    resetting the sum of the plurality of weights; and
    resetting the plurality of RTK engines.

12. The non-transitory computer-readable storage medium of claim 11, wherein the at least a portion of the set of positions comprises outputs from the RTK engines of the plurality of RTK engines that produce a fixed solution.

13. The non-transitory computer-readable storage medium of claim 12, wherein the instructions for determining the plurality of additional position measurements comprises instructions for:
  (d) receiving position signals from a plurality of GNSS satellites and at least one base station;
  (e) determining a set of positions of the GNSS receiver using the plurality of RTK engines based on the received position signals; and
  (f) determining whether the set of positions is within the threshold distance from previously determined positions, wherein in response to determining that the set of positions is within the threshold distance from the previously determined positions:
    storing at least a portion of the set of positions as a position measurement; and
    determining a plurality of weights associated with the position measurement based on a number of RTK engines among the plurality of RTK engines producing a fixed solution that did not produce a fixed solution in a previous measurement or that produced a fixed solution after being reset.

14. The non-transitory computer-readable storage medium of claim 13, wherein instructions for determining whether the set of positions is within the second threshold distance from previously determined positions further comprises instructions for:
  in response to determining that the set of positions is not within the threshold distance from the previously determined positions, resetting the plurality of RTK engines and repeating steps (d)-(f).

15. The non-transitory computer-readable storage medium of claim 14, wherein the at least a portion of the set of positions comprises outputs from the RTK engines of the plurality of RTK engines that produce a fixed solution.

16. The non-transitory computer-readable storage medium of claim 9, wherein each of the plurality of RTK engines comprises a different set of parameters.

* * * * *